(12) United States Patent
Gretz

(10) Patent No.: US 7,304,236 B1
(45) Date of Patent: Dec. 4, 2007

(54) ELECTRICAL BOX ASSEMBLY FOR RECESSED MOUNTING OF HIGH AND LOW VOLTAGE COMPONENTS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/729,715

(22) Filed: Mar. 29, 2007

Related U.S. Application Data

(63) Continuation-in-part of application No. 11/713,381, filed on Mar. 2, 2007.

(51) Int. Cl.
H01H 9/02 (2006.01)

(52) U.S. Cl. .............. 174/58; 174/50; 174/54; 174/63; 248/200; 361/600; 220/3.8

(58) Field of Classification Search ............ 174/58, 174/57, 53, 54, 61, 63, 135, 50; 220/3.2, 220/3.3, 3.4, 3.5, 3.8, 4.02; 248/121, 126, 248/200.906; 361/600; 439/535
See application file for complete search history.

(56) References Cited

U.S. PATENT DOCUMENTS

| | | | |
|---|---|---|---|
| 4,265,365 A * | 5/1981 | Boteler | 220/3.3 |
| 6,147,304 A | 11/2000 | Doherty | |
| 6,747,206 B1 * | 6/2004 | Law | 174/53 |
| 6,956,168 B2 | 10/2005 | Herth | |
| 7,038,132 B1 | 5/2006 | Lowe et al. | |
| 7,075,004 B1 | 7/2006 | Gretz | |
| 7,078,618 B2 * | 7/2006 | Dinh | 174/481 |

\* cited by examiner

*Primary Examiner*—Dhiru R. Patel

(57) ABSTRACT

An electrical box assembly for providing electrical service including line voltage and signal line hookups for a television or home entertainment center. The electrical box assembly recesses electrical components including plug ends of electrical cords within the wall to make them unobtrusive and out of the way. The box assembly includes an integral electrical box for housing two line voltage electrical components and connection points for several low voltage components. The low voltage connection points are capable of accepting standard jacks for broadband cable, direct TV, surround sound cabling, or phone systems. The electrical box assembly includes a box member, a frame member, and a flange on the frame member to enable secure mounting to a pair of studs. A separate embodiment includes the box and frame members in one piece. The electrical box assembly enables easy consolidation of electrical and signal hookups for TV or home entertainment systems.

19 Claims, 19 Drawing Sheets

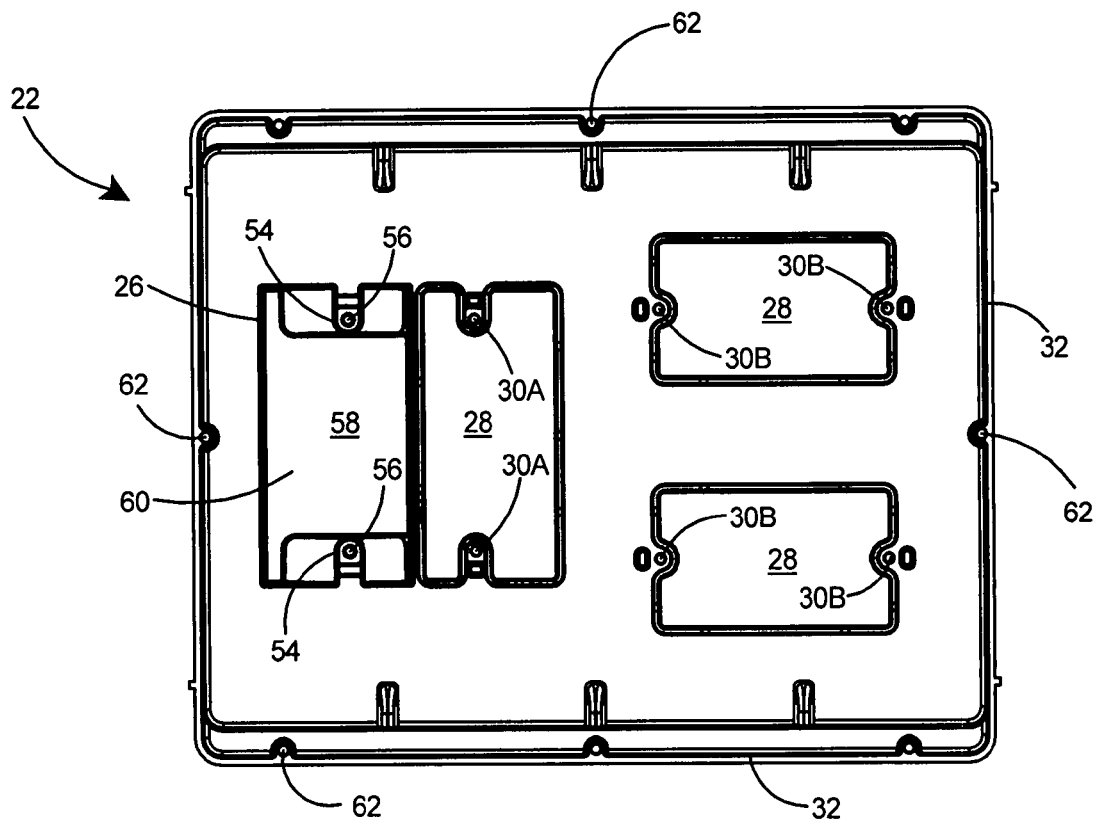
Fig. 3
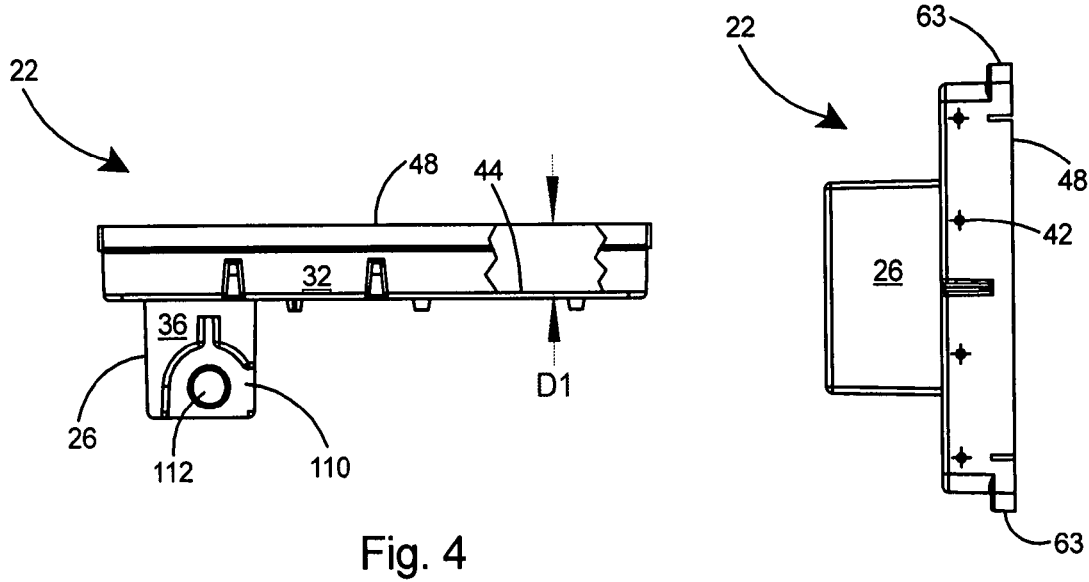
Fig. 4
Fig. 4A

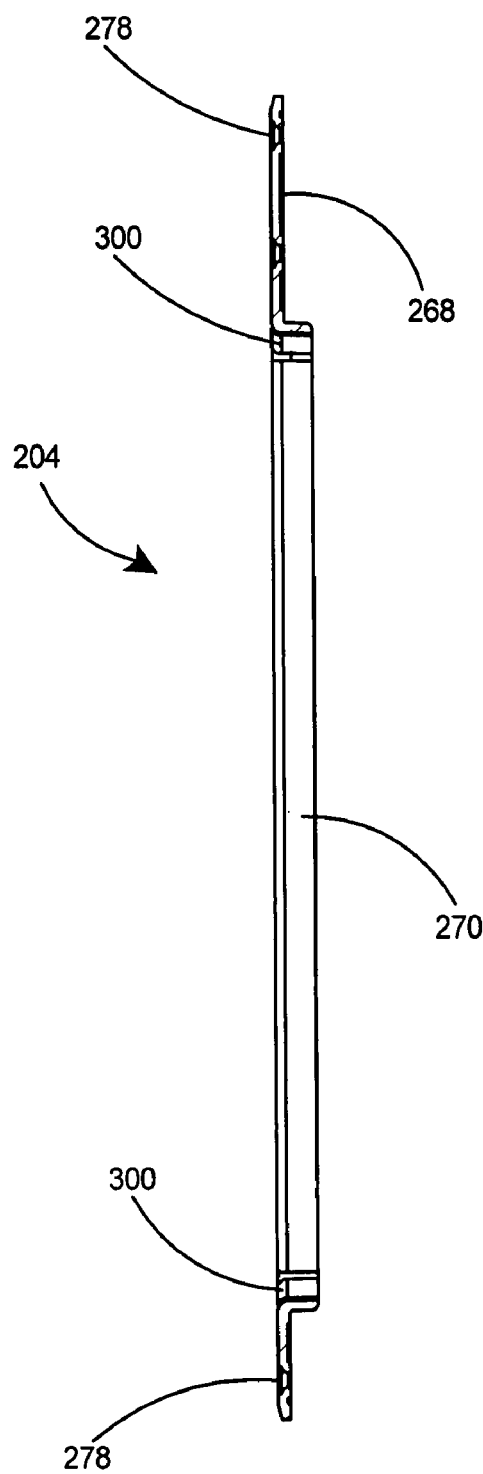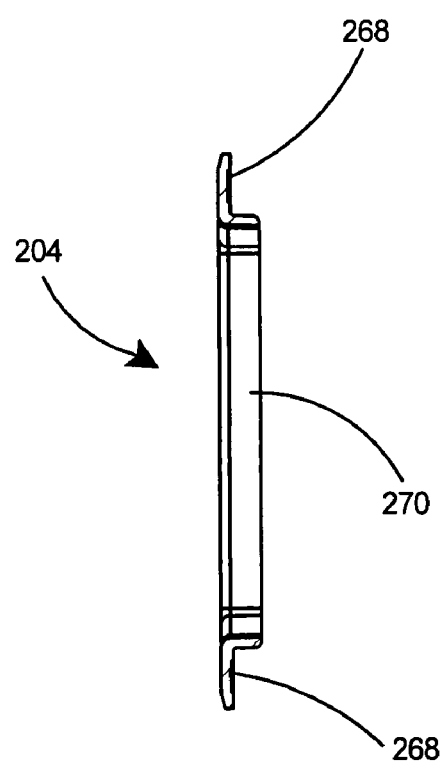
Fig. 23
Fig. 24

ELECTRICAL BOX ASSEMBLY FOR RECESSED MOUNTING OF HIGH AND LOW VOLTAGE COMPONENTS

This application is a Continuation-In-Part of U.S. patent application Ser. No. 11/713,381 filed Mar. 2, 2007 and still pending, the entire contents of which are incorporated herein by reference.

FIELD OF THE INVENTION

This invention relates to electrical box assemblies for mounting components for high and low voltage devices and specifically to a flat panel TV box assembly that can be easily installed on an interior wall of a building to provide a recessed housing for electrical services and cable TV connections to a television, computer, or home stereo system.

BACKGROUND OF THE INVENTION

With the proliferation of high definition televisions and various auxiliary devices, such as digital videodisc players, game stations, and surround sound systems, there is a need to manage the connections between these devices to ensure there is adequate power and also to manage the myriad of cables and cords that accompany such systems. Additionally, many electrical boxes for both high and low voltage components mount the components flush with the wall, which makes the plugs or connectors that mate with the wall-mounted components susceptible to damage, such as when devices, such as vacuum cleaners or other household hazards brush against the plugs or connectors.

What is needed therefore is an electrical box assembly that provides connection points for both high and low voltage components, provides isolation of high voltage connections from low voltage connections, provides features for managing the plethora of cables and wiring associated with modern television systems, and recesses the end connector of cords or cables to protect the plug ends of cords or end connectors of cables from undesirable contact with household appliances or household occupants.

An electrical box assembly was disclosed by the inventor in U.S. patent application Ser. No. 11/713,381, filed Mar. 2, 2007, and commonly owned with the present invention. The electrical box assembly of U.S. Ser. No. 11/713,381 included a box member and a frame member that formed an electrical box assembly for recessing high and low voltage electrical components within the wall of a structure and providing a mounting area for organizing the various electrical leads that supply a home entertainment center, such as a TV or stereo system. The current invention provides an improved electrical box assembly that accommodates two high voltage components and recesses the high voltage components farther within the wall and also provides an extended flange for more secure mounting of the electrical box assembly to a wall.

SUMMARY OF THE INVENTION

The invention is an electrical box assembly that provides electrical service including line voltage and signal line hookups for a television or home entertainment center. The electrical box assembly recesses electrical components within the wall to make them unobtrusive and out of the way. The box assembly includes an integral electrical box for housing two line voltage connections and connection points for several low voltage openings. The low voltage connection points are capable of accepting standard jacks for broadband cable, direct TV, surround sound cabling, or phone systems. The electrical box assembly includes a box member, a frame member, and an extended flange on the frame member to enable secure mounting to a pair of studs. The electrical box assembly enables easy consolidation of all the various electrical and signal hookups for TV or home entertainment systems.

OBJECTS AND ADVANTAGES

The electrical box assembly of the present invention includes several advantages over the prior art, including:

(1) Connection points are provided for mounting both high and low voltage components. An electrical box, integral with the box member of the assembly, is provided for housing and isolating a plurality of high voltage components, such as a duplex receptacle to provide line voltage to a TV or other electrical device. Connection points are also provided for mounting several low voltage components, such as a coupling plate for a coaxial cable.

(2) The electrical box assembly includes a backward projecting box portion that mounts within a wall, thereby recessing electrical devices within the wall to render them unobtrusive and out of the way. By recessing the electrical devices, the plug ends of cords or end connectors of cables are advantageously protected from undesirable contact with household appliances, household occupants, or other hazards.

(3) The electrical box assembly provides features for managing the plethora of cables and wiring associated with modern television systems, including integral loops for bundling and tying-off wires and cables, thereby providing a clean installation that is unobtrusive and minimizes excessive wires and cables running between the wall and the television, speaker system, or other components of a home entertainment system. The loops are positioned against the back wall of the box member, thereby positioning the wires and cables along the back wall of the assembly and advantageously recessing them behind the wall surface and away from household hazards.

(4) Mounting apertures are provided to coincide with the standard stud spacing to meet local construction codes. As a result, the electrical box assembly can be securely mounted between and supported by two adjacent studs.

These and other objects and advantages of the present invention will be better understood by reading the following description along with reference to the drawings.

DESCRIPTION OF THE DRAWINGS

FIG. 3 is a front view of the box member of FIG. 2.

FIG. 4 is a bottom view of the box member of FIG. 3.

FIG. 4A is a side view of the box member of FIG. 3.

FIG. 23 is a sectional view of the frame member taken along line 23-23 of FIG. 22.

FIG. 24 is a sectional view of the frame member taken along line 24-24 of FIG. 22.

TABLE OF NOMENCLATURE

Figure 1:
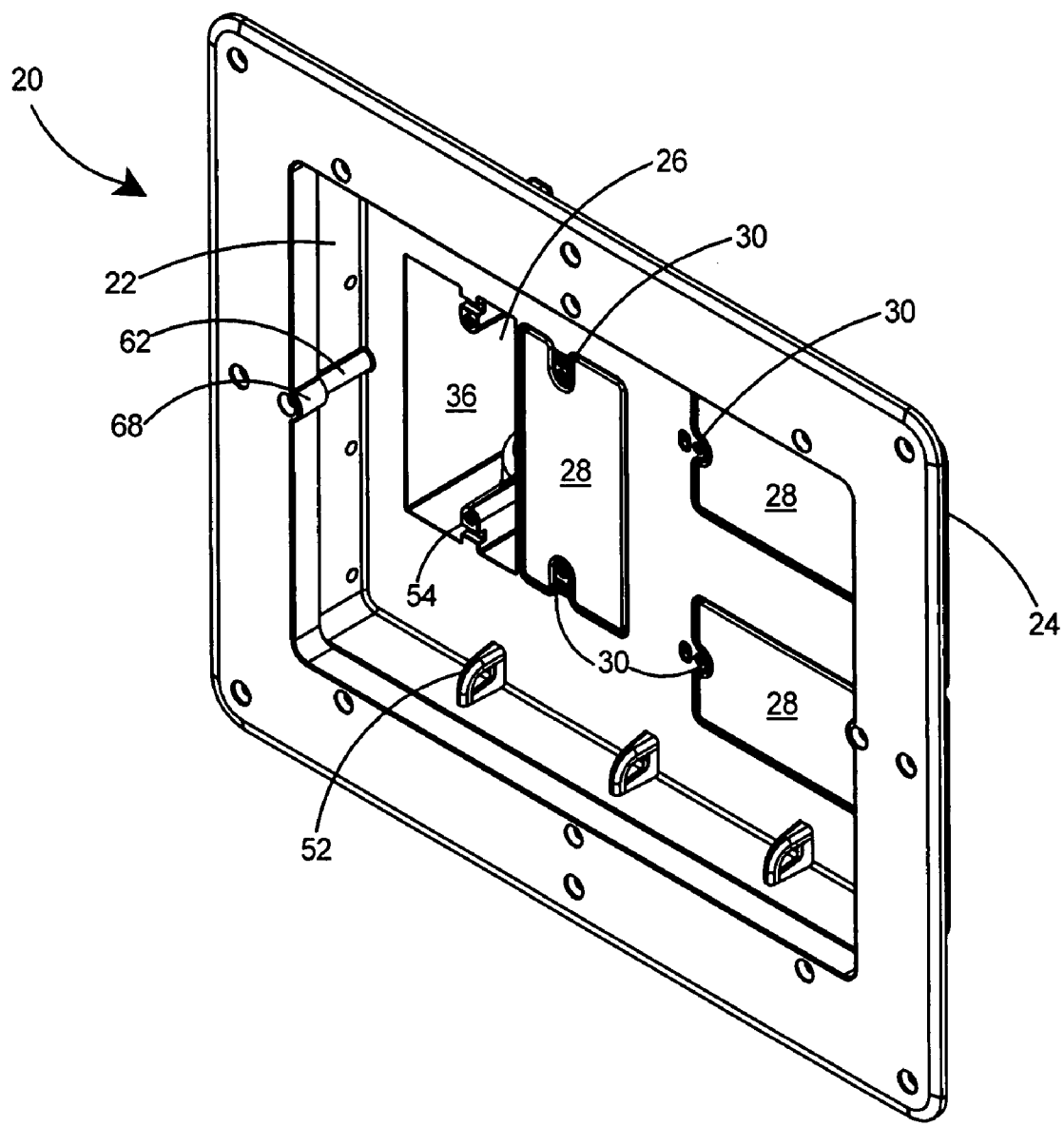
FIG. 1 is a perspective view of a first embodiment of a flat panel TV box assembly according to the present invention.

The following is a listing of part numbers used in the drawings along with a brief description:

| Part Number | Description |
| --- | --- |
| 20 | electrical box assembly |
| 22 | box member |
| 24 | frame member |
| 26 | electrical box |
| 28 | open area |
| 30 | connection point |
| 30A | vertically oriented connection point |
| 30B | horizontally oriented connection point |
| 32 | peripheral wall of box member |
| 34 | back wall of box member |
| 36 | sidewalls of electrical box |
| 38 | side of open area |
| 40 | sidewall portion of peripheral wall |
| 42 | aperture in sidewall of box member |
| 44 | inner edge of peripheral wall |
| 46 | juncture of peripheral wall and back wall |
| 48 | outer edge of peripheral wall |
| 50 | bottom wall |
| 52 | loop member |
| 54 | boss of electrical box |
| 56 | threaded bore |
| 58 | rear wall of electrical box |
| 60 | high voltage enclosure |
| 62 | boss on peripheral wall of box member |
| 63 | flared portion on sidewalls of peripheral wall |
| 64 | peripheral flange of frame member |
| 66 | transverse flange of frame member |
| 68 | guide member |
| 69 | inner edge of transverse flange |
| 70 | aperture in transverse flange |
| 72 | attachment arrangement |
| 74 | fastener for securing frame to box member |
| 76 | aperture for low voltage component |
| 78 | hole |
| 80 | sheet rock |
| 82 | wall |
| 84 | stud |
| 86 | mounting arrangement |
| 87 | fastener |
| 88 | mounting fastener |
| 89 | apertures in transverse flange |
| 90 | duplex receptacle |
| 92 | fastener |
| 94 | cover plate |
| 96 | CATV connector plate |
| 98 | fastener |
| 99 | outer edge of electrical box assembly |
| 100 | plug end |
| 102 | electrical cord |
| 104 | horizontally oriented CATV connector |
| 106 | vertically oriented CATV connector |
| 108 | telephone jack |
| 110 | depressed area |
| 112 | removable wall portion or knockout |
| 114 | push-in electrical connector |
| 200 | electrical box assembly |
| 202 | box member |
| 204 | frame member |
| 206 | peripheral sidewall |
| 208 | front edge |
| 209 | first portion of box member |
| 210 | second portion of box member |
| 212 | back wall |
| 214 | electrical box |
| 216 | side of electrical box |
| 218 | rear wall of electrical box |
| 220 | connection point for high voltage component |
| 222 | first sidewall portion |
| 224 | second sidewall portion |
| 226 | rear edge of second sidewall portion |
| 228 | short wall |
| 230 | edge of first sidewall portion |
| 232 | stiffening rib |
| 234 | exterior rib |
| 236 | outer surface of box member |
| 238 | tab |
| 240 | first end of tab |

-continued

| Part Number | Description |
| --- | --- |
| 242 | second end of tab |
| 244 | integral boss |
| 246 | bore |
| 248 | low voltage opening in back wall |
| 250 | connection point for low voltage component |
| 252 | boss at low voltage opening |
| 254 | groove |
| 256 | divider Wall |
| 258 | knockout |
| 260 | top wall portion |
| 262 | bottom wall portion |
| 264 | loop member |
| 266 | opening in loop member |
| 268 | transverse flange |
| 270 | peripheral flange |
| 272 | top portion of transverse flange |
| 274 | bottom portion of transverse flange |
| 276 | side portion of transverse flange |
| 278 | mounting aperture |
| 280 | mounting arrangement |
| 282 | hole in wall |
| 284 | wall |
| 286 | mounting fastener |
| 288 | stud |
| 290 | second set of mounting apertures |
| 292 | duplex receptacle high voltage component |
| 294 | low voltage component |
| 296 | attachment arrangement |
| 298 | boss of attachment arrangement |
| 300 | aperture of attachment arrangement |
| 302 | fastener of attachment arrangement |
| 304 | aperture in wall |
| 306 | sheetrock |
| 308 | face of stud |
| 310 | fastener |
| 312 | aperture in peripheral wall |
| 314 | electrical box assembly, one-piece embodiment |
| 316 | plug end of electrical cord |
| 318 | electrical cord |
| D1 | depth of peripheral wall |
| D2 | length of tab |
| D3 | stud center to center spacing |
| D4 | depth of recessed high voltage component |
| D5 | depth of recessed low voltage component |

DETAILED DESCRIPTION OF THE INVENTION

FIG. 1 depicts a first embodiment of an electrical box assembly 20 according to the present invention. The recessed electrical box assembly 20 includes a box member 22 and a frame member 24. The box member 22 includes an electrical box 26 for accommodating high voltage components (not shown) and open areas 28 having connection points 30 for accommodating low voltage components (not shown).

Figure 2:
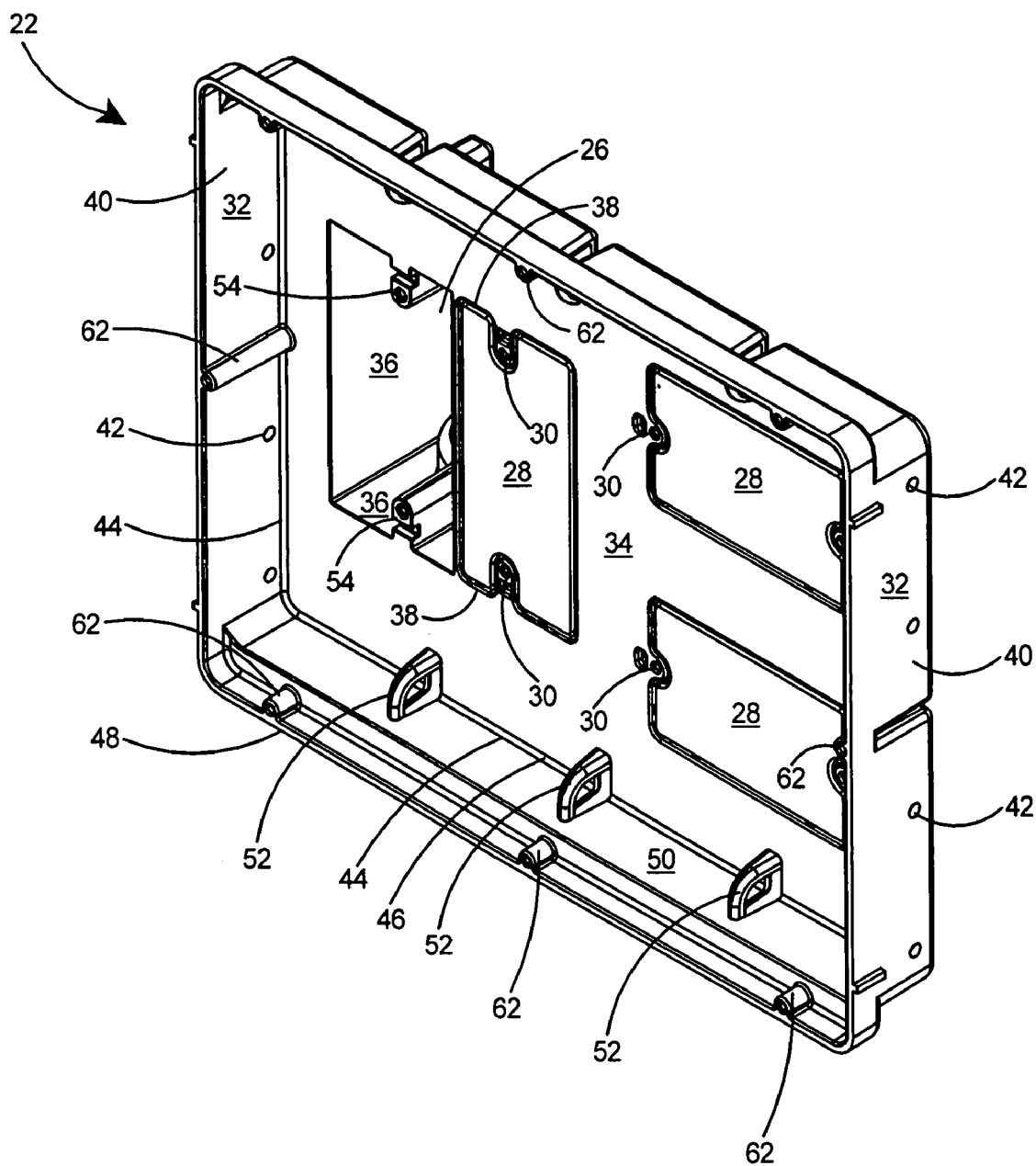
FIG. 2 is a perspective view of a box member that forms a portion of the flat panel TV box assembly of FIG. 1.

With reference to FIG. 2, a first embodiment of the box member 22 includes a forward extending peripheral wall 32 and a back wall 34. The electrical box 26 includes sidewalls 36 and is integral with the back wall 34 of the box member 22. The connection points 30 are provided on the back wall 34 of the box member 22 typically on opposing sides 38 of the open areas 28. The peripheral wall 32 of the box member 22 includes sidewalls 40 and apertures 42 are provided in the sidewalls 40. The peripheral wall 32 of the box member 22 includes an inner edge 44 at a juncture 46 with the back wall 34 of the box member 22 and an outer edge 48 with the apertures 42 in the peripheral wall 32 adjacent or very close to the inner edge 44. The peripheral wall 32 of the box member 22 includes a bottom wall 50 and loop members 52 in linear alignment along the bottom wall 50. The loop members 52 extend across the juncture 46 of the bottom wall 50 and the back wall 34. The electrical box 26 includes bosses 54 that are integral with the sidewalls 36 of the electrical box 26.

Referring to FIGS. 3-4A, threaded bores 56 are provided in the bosses 54 of the electrical box 26. The electrical box 26 includes a rear wall 58 that closes the rear of the electrical box and provides a high voltage enclosure 60 therein. As shown at the cutaway portion of the peripheral wall 32 in FIG. 4, the peripheral wall 32 of the box member 22 includes a depth D1 as measured from the inner edge 44 to the outer edge 48. The box member 22 includes a plurality of bosses 62 extending inward from the peripheral wall 32. The peripheral wall 32 of the box member 22 further includes a flared portion 63 near the outer edge 48 at both the top and bottom ends of the peripheral wall 32. As shown in FIG. 3, the connection points 30 for the low voltage components may include connection points 30A aligned for vertical connection of the low voltage components and connection points 30B aligned for horizontal connection of the low voltage components.

Figure 5:
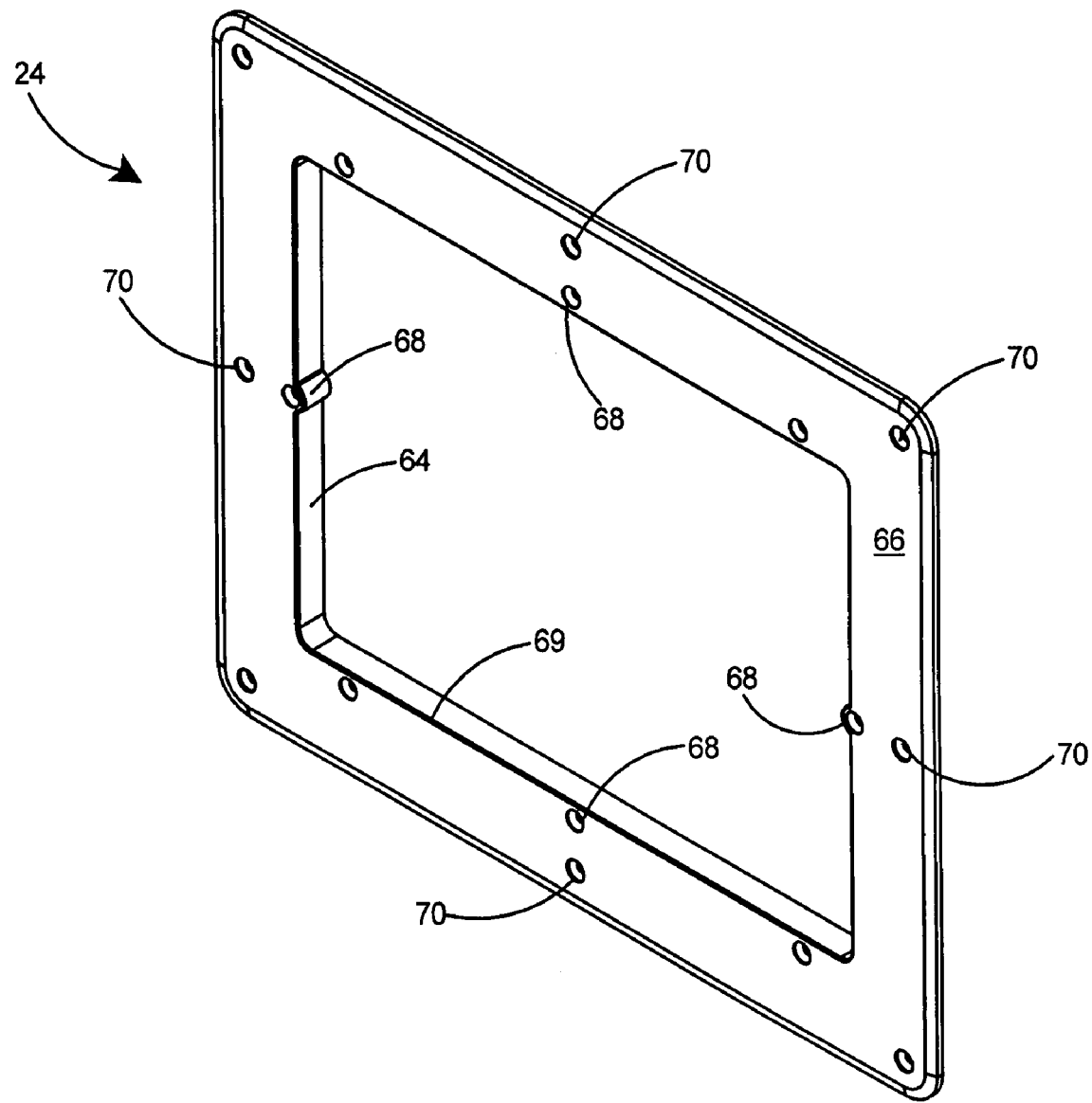
FIG. 5 is a perspective view of a frame member that forms a portion of the flat panel TV box assembly of FIG. 1.
Figure 6:
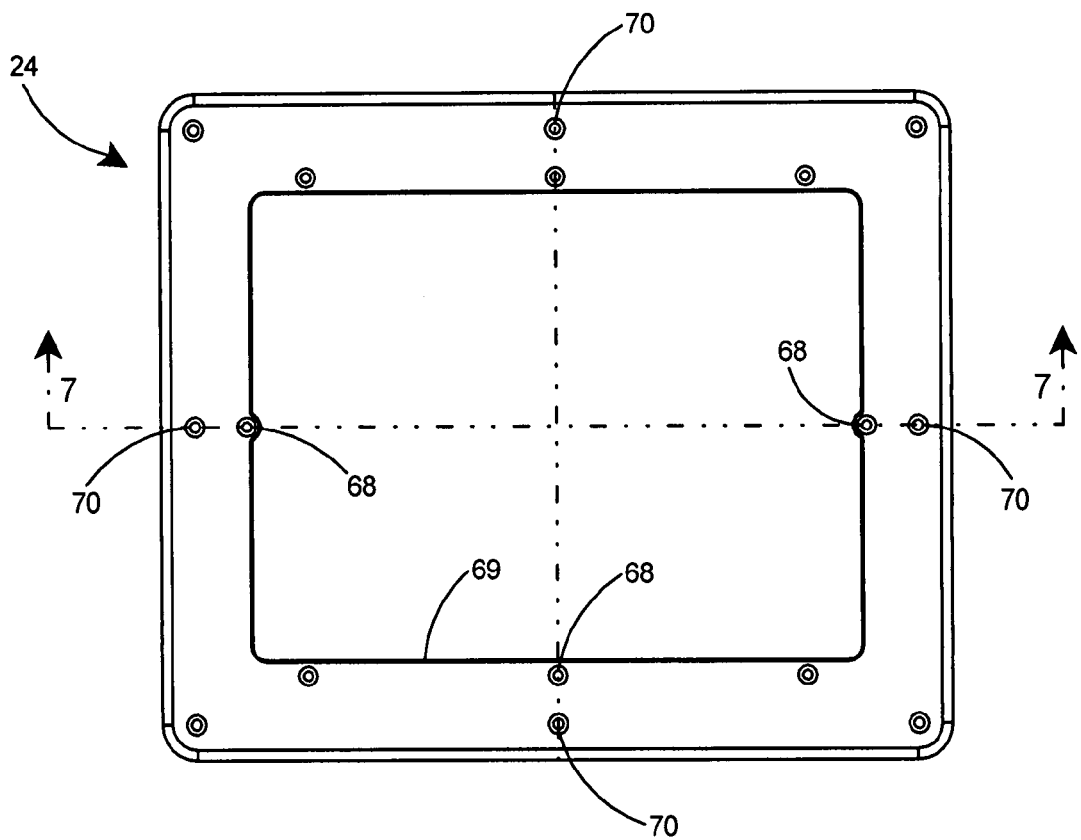
FIG. 6 is a front view of the frame member of FIG. 5.
Figure 7:
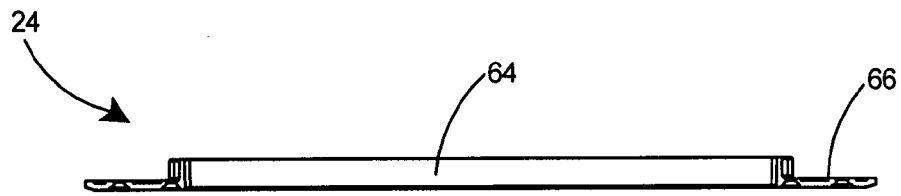
FIG. 7 is a sectional view of the frame member taken along line 7-7 of FIG. 6.

With reference to FIGS. 5-7, a first embodiment of the frame member 24 includes a rearward extending peripheral flange 64 and a transversely extending flange 66. A plurality of guide members 68 is provided on the peripheral flange 64, with each guide member 68 positioned along the inner edge 69 of the transverse flange 66 of the frame member 24. The transverse flange 66 of the frame member 24 includes apertures 70 therein.

Figure 8:
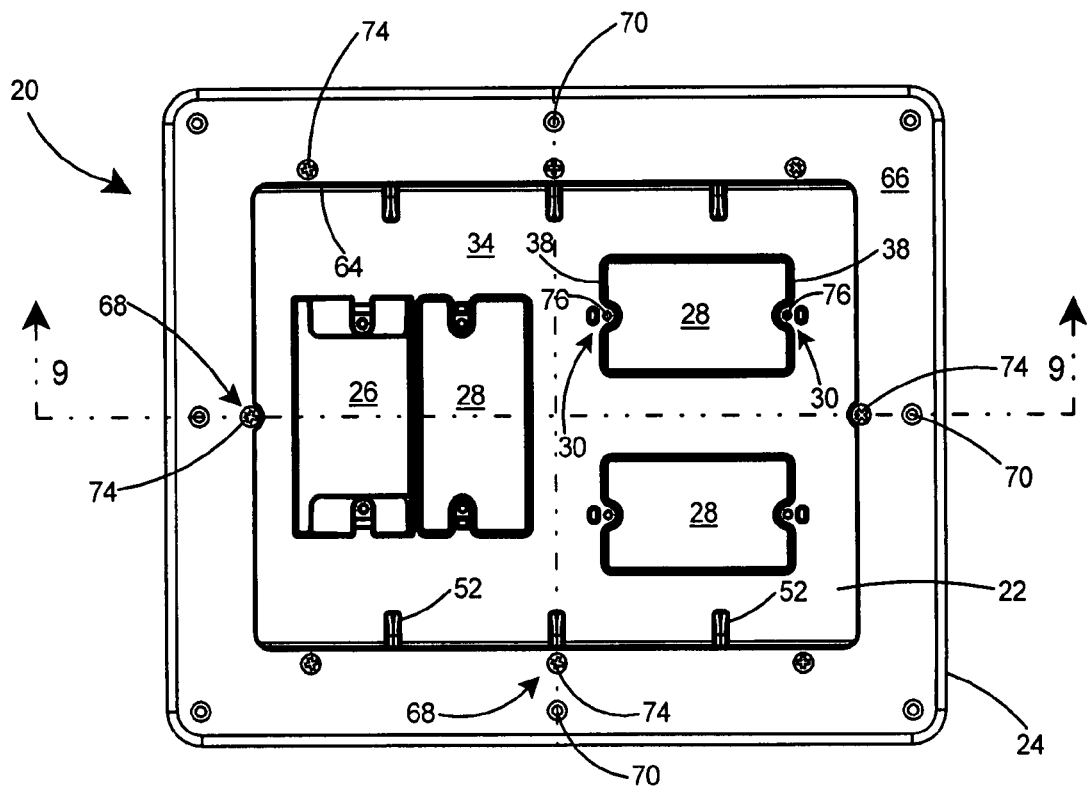
FIG. 8 is a front view of the flat panel TV box assembly of FIG. 1.
Figure 9:
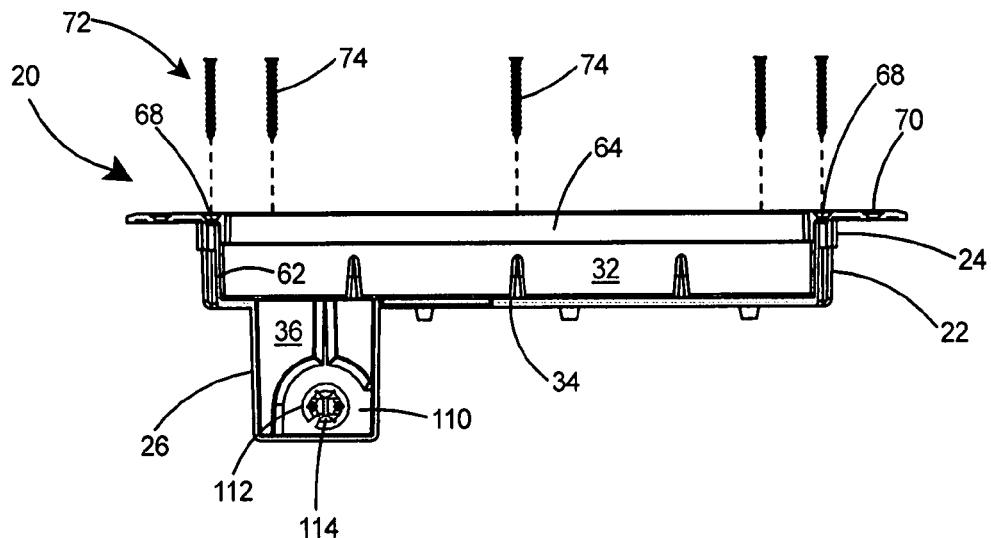
FIG. 9 is a sectional view of the flat panel TV box assembly taken along line 9-9 of FIG. 8.

Referring to FIGS. 8 and 9, there is shown an attachment arrangement 72 for securing the frame member 24 to the box member 22 to create the recessed electrical box assembly 20 of the present invention. The attachment arrangement 72 includes fasteners 74 which are secured through each guide member 68 on the peripheral flange 64 of the frame member 24 into a corresponding boss 62 (see FIG. 2) on the peripheral wall 32 of the box member 22. To secure the frame member 24 to the box member 22, the peripheral flange 64 of the frame member 24 is aligned with the peripheral wall 32 of the box member 22. With the frame member 24 thus aligned with the box member 22, each guide member 68 in the frame 24 is aligned with a corresponding boss 62 in the box member 22. As shown in FIG. 8, the connection points 30 for low voltage components (not shown) include apertures 76 on opposing sides 38 of the open areas 28 in the back wall 34 of the box member 22.

Figure 10:
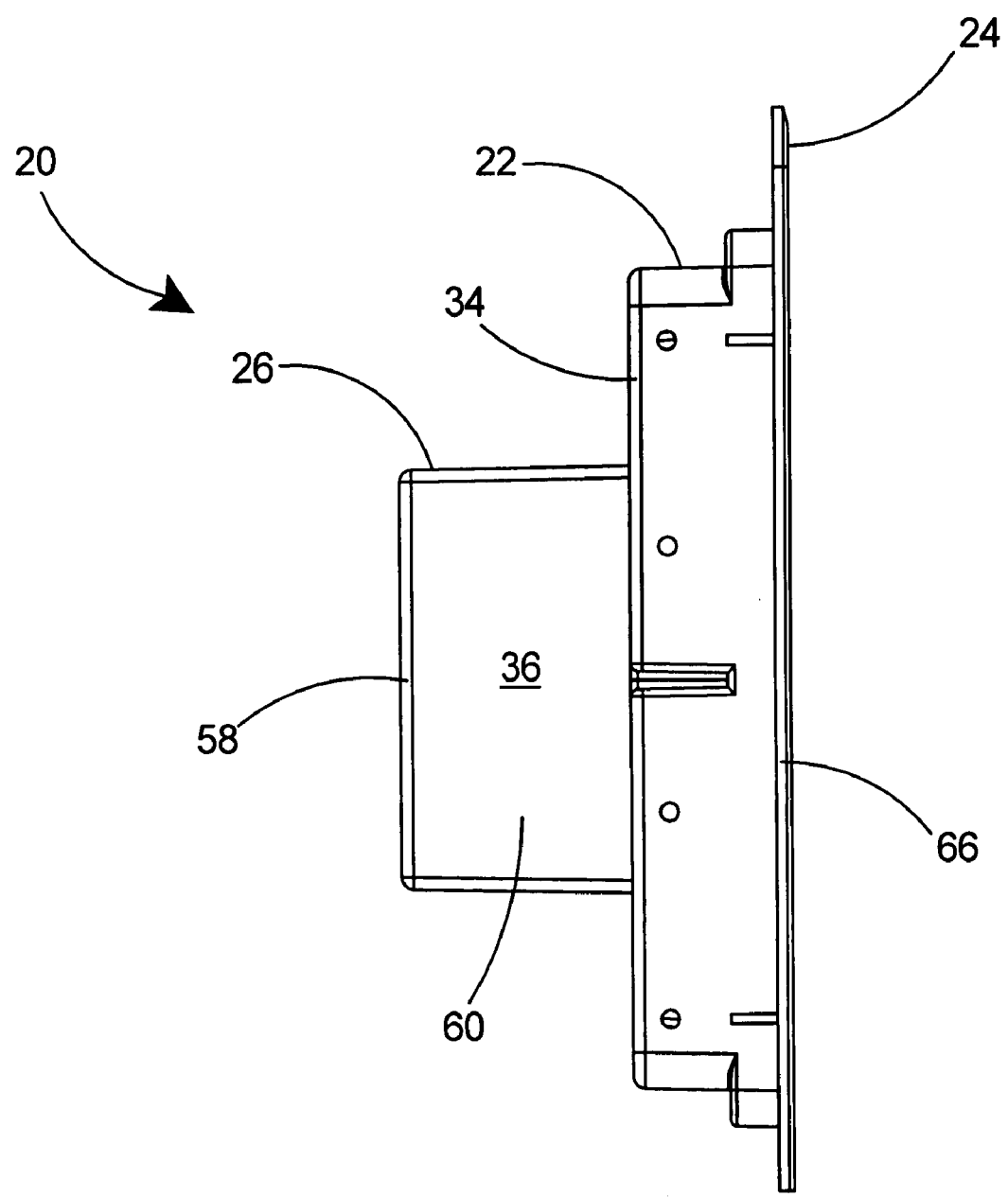
FIG. 10 is a side view of the flat panel TV box assembly of FIG. 8.

As shown in FIG. 10, after the frame member 24 is secured to the box member 22 to form electrical box assembly 20, the electrical box 26 projects from the back wall 34 of the box member 22 and the sidewalls 36 and rear wall 58 of the electrical box 26. The sidewalls 36 and rear wall 58 of the electrical box 26 thereby create a high voltage enclosure 60 that isolates any high voltage wiring or components therein (not shown) from nearby low voltage components.

Figure 11:
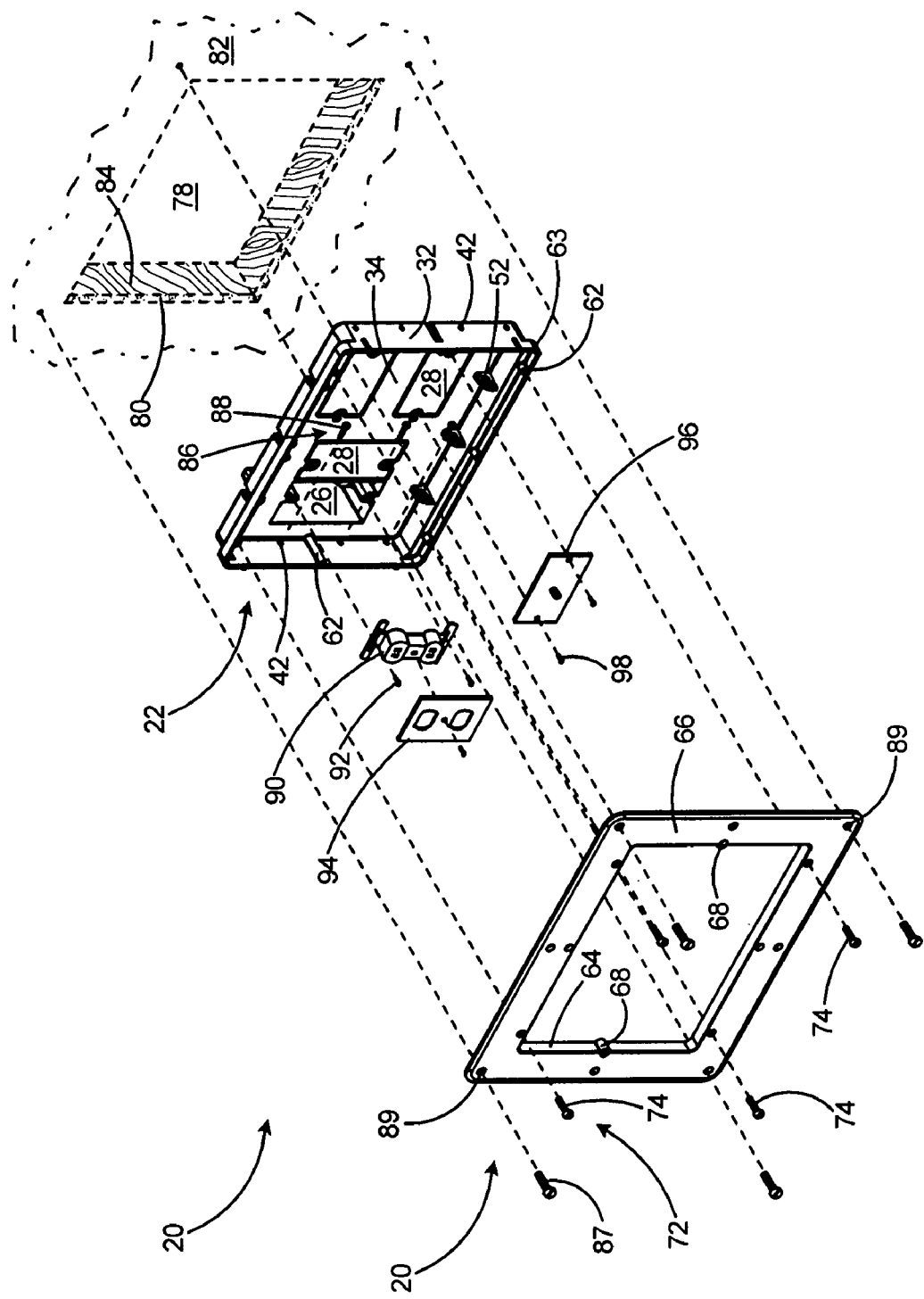
FIG. 11 is an exploded perspective view of the flat panel TV box assembly of the present invention including some high and low voltage components in alignment with the box assembly to be installed therein.

For operation of the electrical box assembly 20 of the present invention, reference is made to FIG. 11. An installer first cuts a hole 78 in the sheet rock 80 or similar wall covering on a wall 82 thereby exposing a stud 84. The box member 22 is inserted into the hole 78 until the transverse flange 66 is flush with the surrounding wall 82. The electrical box assembly 20 includes a mounting arrangement 86 for securing the box member 22 to the stud 84 and thereby positioning the back wall 34 of the box member substantially within the wall 82. The mounting arrangement 86 for securing the box member 22 to the stud 84 includes mounting fasteners 88 that are secured through the apertures 42 in the peripheral wall 32 and into the stud 84 thereby securing the box member 22 to the stud 84. After the box member 22 is secured to the stud 84, the frame member 24 is secured to the box member 22 by tightening the fasteners 74 of the attachment arrangement 72 through the guide members 68 of the frame 24 and into the bosses 62 on the peripheral wall 32 of the box member 22. As an alternative to fastening the frame 24 to the box member 22 with the attachment arrangement, the frame 24 may be secured directly to the wall 82 by driving fasteners 87 through alternative apertures 89 in the transverse flange 66 into the wall 82. A high voltage component such as the duplex power receptacle 90 can be secured to the electrical box 26 by fasteners 92 and a cover plate 94 attached thereto. Low voltage components such as the CATV connector plate 96 can then be secured with fasteners 98 to the connection points 30 surrounding the open areas 28.

Figure 12:
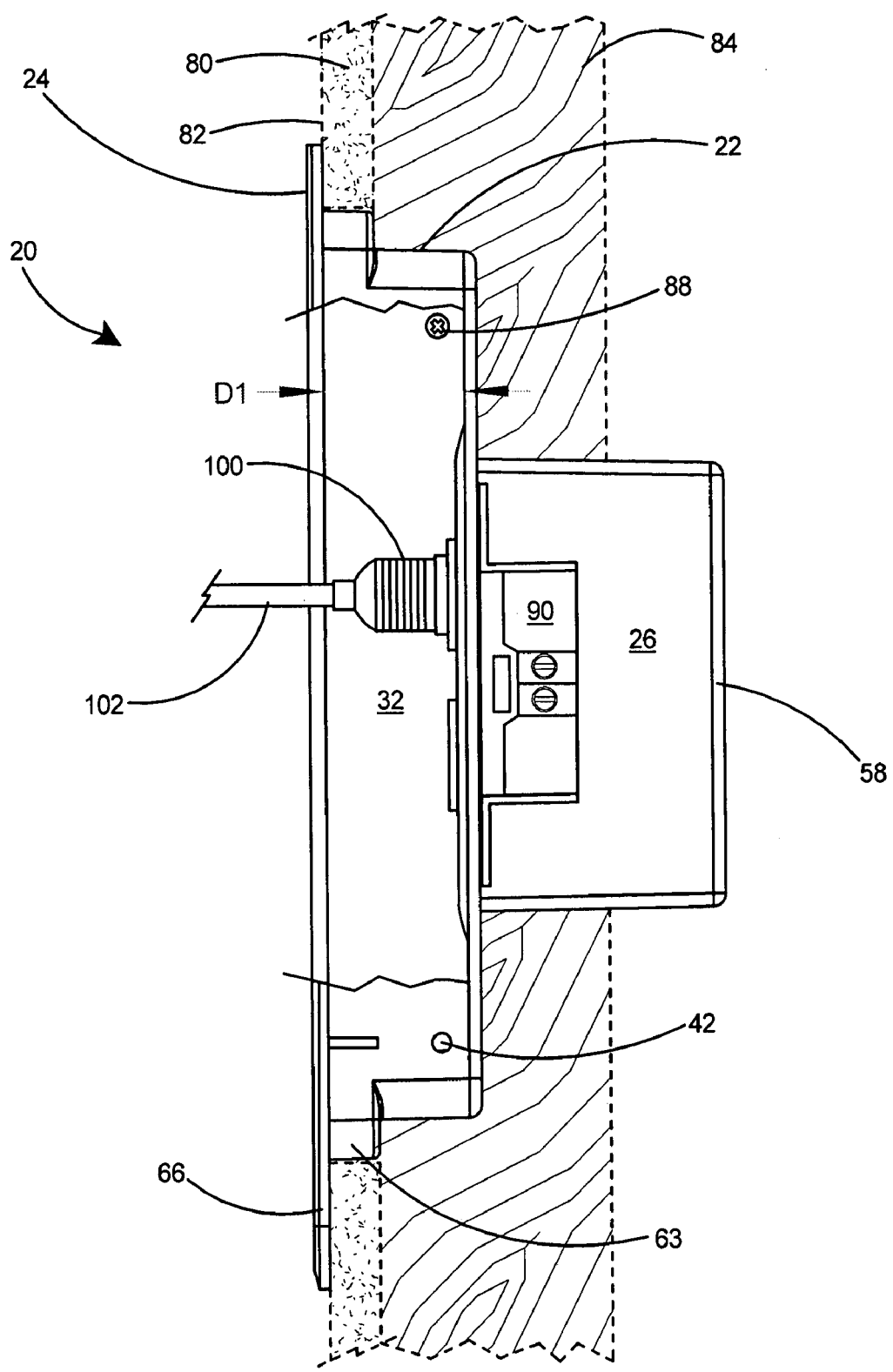
FIG. 12 is a side view of the flat panel TV box assembly with a portion of the frame member and box member cut away to show a duplex power receptacle and an electrical cord plugged therein.

Referring to FIG. 12, after the electrical box assembly 20 is secured to the wall 82 and electrical components installed therein, all electrical components, such as the duplex receptacle 90 shown, are recessed within the wall 82 by at least the depth D1 of the peripheral wall 32 of the box member 22. Preferably the electrical components are recessed from the outer edge 99 of the electrical box assembly 20 by between 1 and 2 inches. Most preferably, the electrical components are recessed from the outer edge 99 of the electrical box assembly 20 by at least 1.5 inches. With the electrical box assembly 20 recessed within the wall 82 as shown, the plug ends 100 of cords 102 or connector ends of low voltage cables (not shown) are protected from being dislodged by contact from vacuum cleaners or similar hazards.

Figure 13:
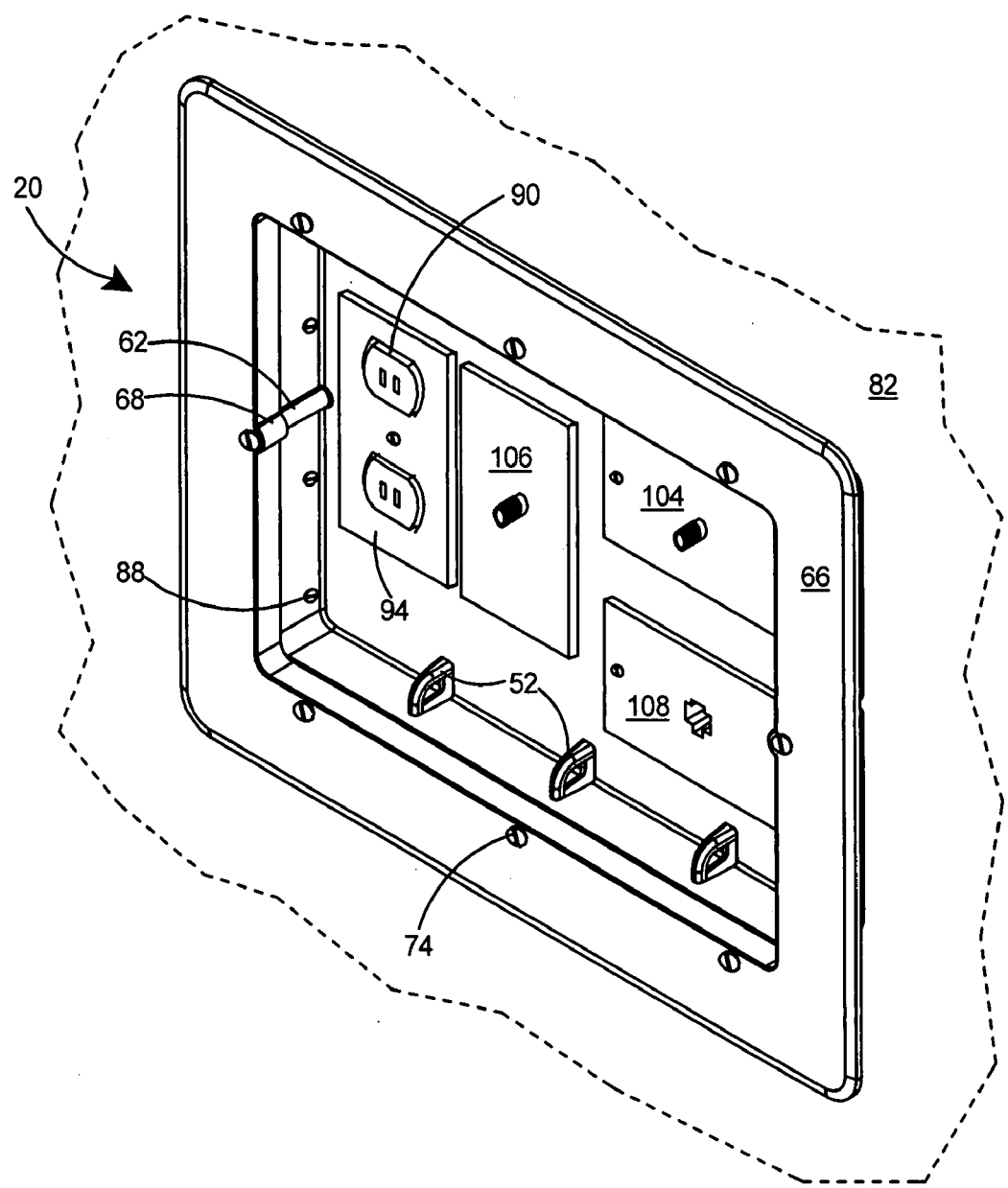
FIG. 13 is a perspective view of a flat panel TV box assembly according to the present invention installed in a wall and with high and low voltage components installed therein.

With reference to FIG. 13 there is shown a completed installation of an electrical box assembly 20 of the present invention in a wall 82. The electrical box assembly 20 includes a duplex receptacle 90 and cover plate 94, a horizontally oriented CATV connector 104, a vertically oriented CATV connector 106, and a horizontally oriented telephone jack 108.

As shown in FIG. 4 or 9, the electrical box 26 of the present invention may include a depressed area 110 in one of the sidewalls 36 and a knockout or removable wall portion 112 therein in the depressed area 110. The depressed area 110 in the sidewall 36 enables the use of electrical fittings or connectors such as the Black Button™ push-in connector 114 for connecting non-metallic cable to electrical boxes, which is available from Arlington Industries of Scranton, Pa. The depressed area 110 permits use of the connectors 114 without projecting from the sidewall 36 and interfering with placement of the electrical box assembly 20 in locations where space is tightly restricted.

Figure 14:
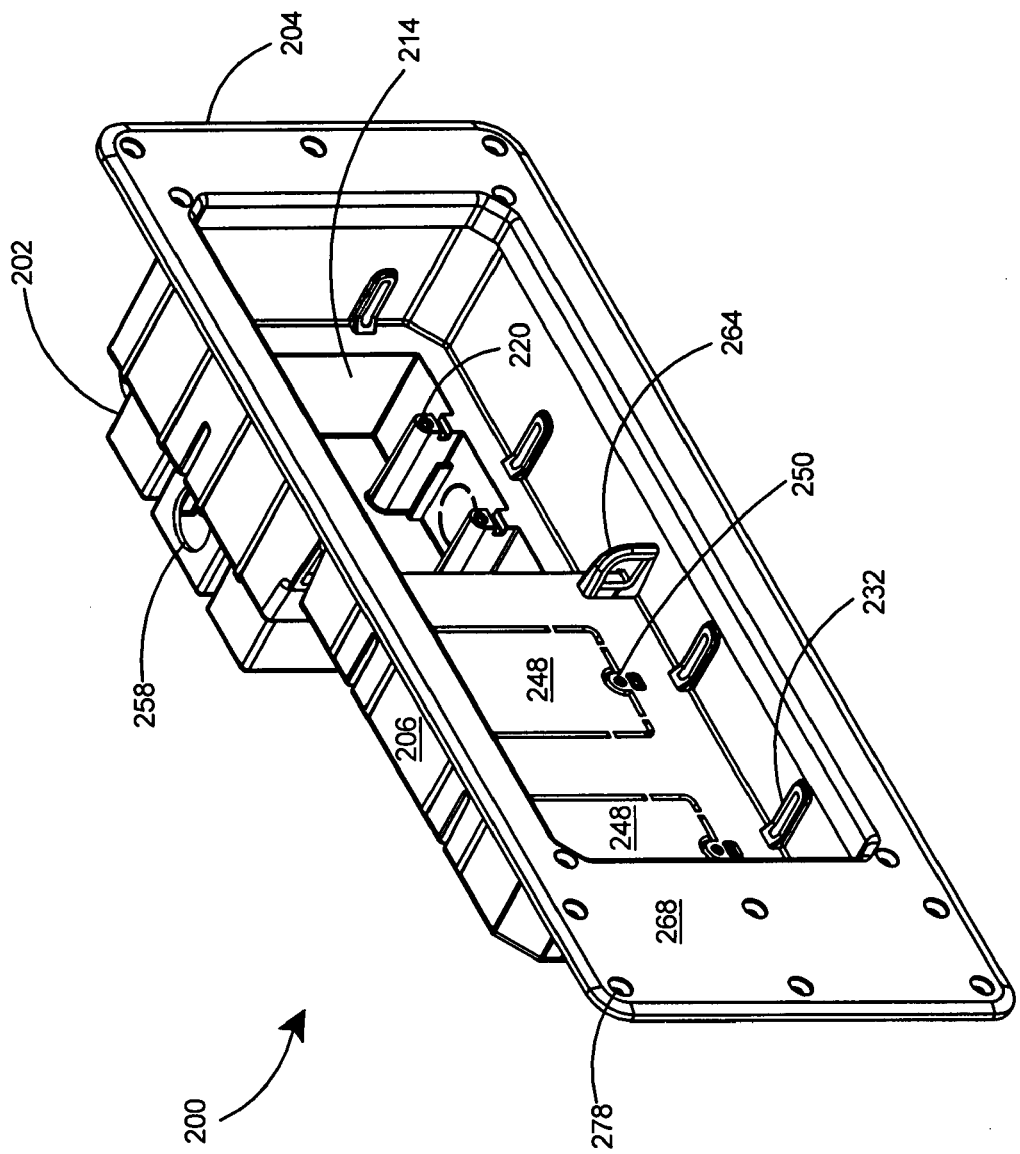
FIG. 14 is a perspective view of a second and preferred embodiment of a flat panel TV box assembly according to the present invention.

With reference to FIG. 14 there is shown a second and preferred embodiment of an electrical box assembly 200 according to the present invention. Although the electrical box assembly 200 is depicted with a box member 202 and a frame member 204, the electrical box assembly could also be constructed and provided in one piece, with the frame member 204 integral with the box member 202.

Figure 15:
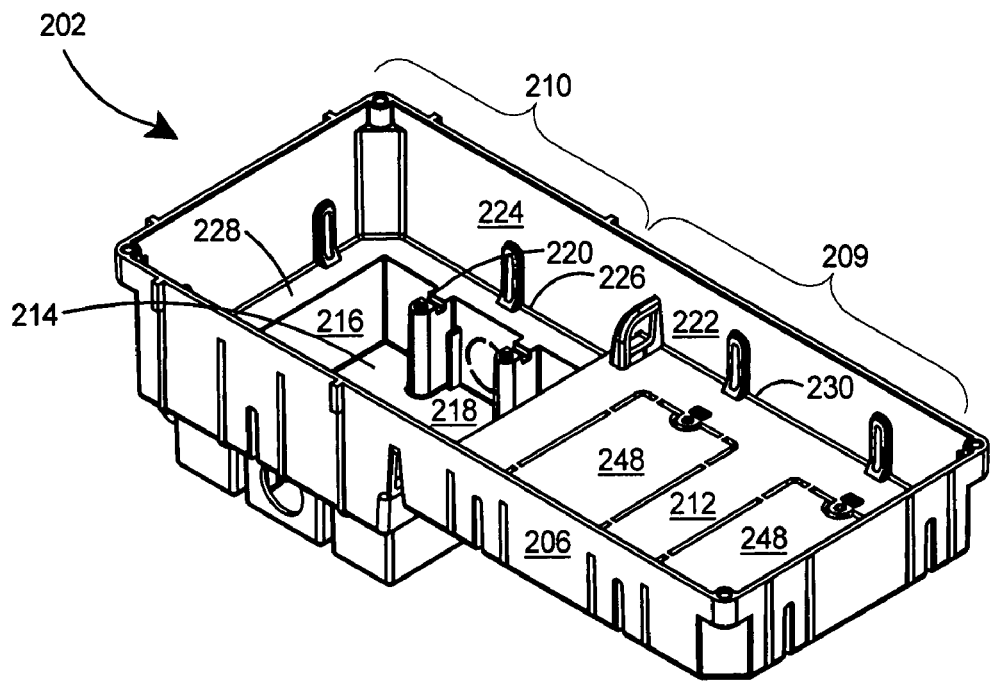
FIG. 15 is a front perspective view of the preferred embodiment of a box member that forms a portion of the flat panel TV box assembly of FIG. 14.

Referring to FIG. 15, the box member 202 includes a rearward extending peripheral sidewall 206 having a front edge 208. The box member 202 includes a first portion 209 and a second portion 210 with a back wall 212 closing off the box member 202 at the first portion 209. An electrical box 214 extends rearward from the second portion 210 of the box member 202. The electrical box 214 includes sides 216 and a rear wall 218. Connection points 220 are provided in the electrical box 214 for later connecting an electrical component (not shown) thereto. The first portion 209 of the box member 202 includes a first sidewall portion 222 and the second portion 210 of the box member 202 includes a second sidewall portion 224 with the second sidewall portion 224 extending to a greater depth from the front edge 208 than the first sidewall portion 222. The second sidewall portion 224 includes a rear edge 226 and a short wall 228 extending transversely at the rear edge 226. The first sidewall portion 224 terminates in an edge 230. The sides 216 of the electrical box 214 extend rearward from the edge 226 of the short wall 228.

As shown in FIG. 15, the interior of the box member 202 includes a plurality of stiffening ribs 232 extending from the back wall 212 and along a substantial portion of the peripheral sidewall 206 toward the front edge 208. Additionally, as shown in FIG. 16, exterior ribs 234 project from the exterior surface of the short wall 228 and along the exterior surface of the sides 216 of the electrical box 214.

Figure 16:
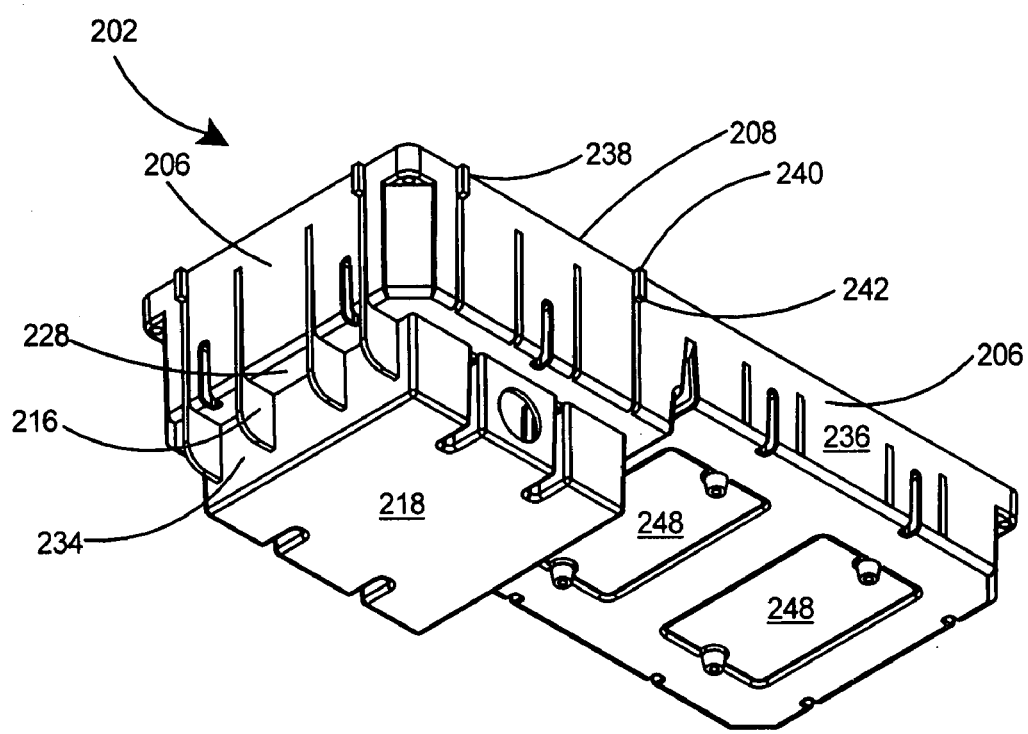
FIG. 16 is a rear perspective view of a box member that forms a portion of the flat panel TV box assembly of FIG. 14.

With reference to FIG. 16, the peripheral sidewall 206 of the box member 202 includes an outer surface 236 and tabs 238 extending from the outer surface 236. The tabs 238 include a first end 240 flush with the front edge 208 of the box member 202 and a second end 242 at a distance D2 (see FIG. 20) from the front edge 208. Preferably, the distance D2 is between 0.25 and 0.75 inches for later aligning the front edge 208 of the box member 202 at a proper offset from a stud for accommodating sheetrock thereon (see FIG. 27).

Figure 17:
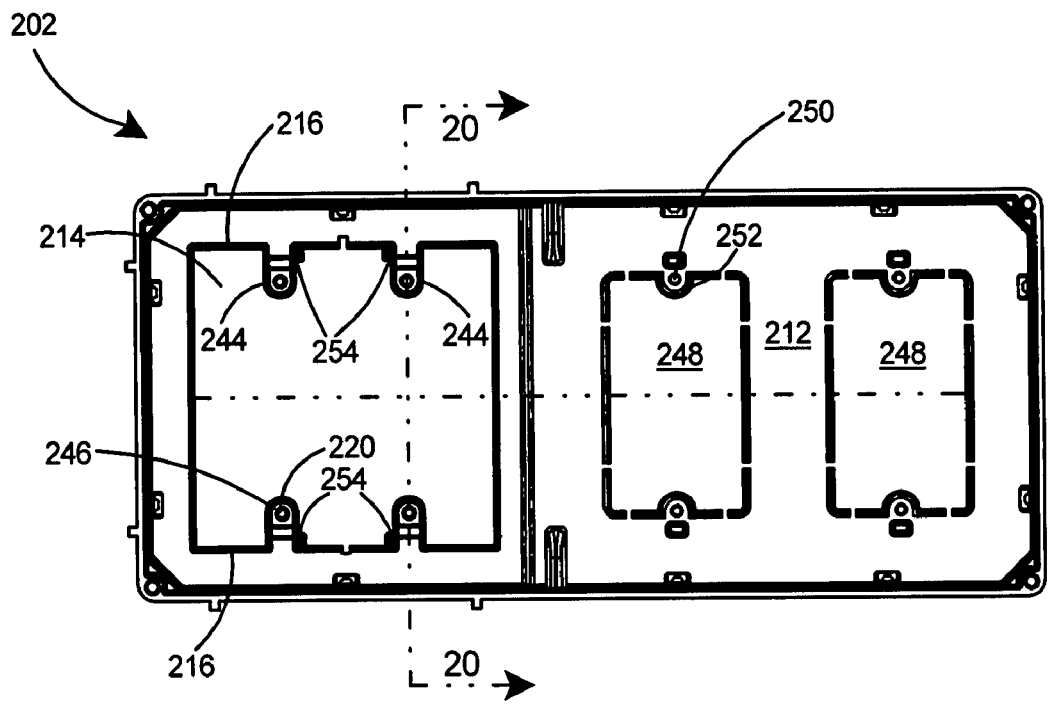
FIG. 17 is a front view of the box member of FIG. 15.

Referring to FIG. 17, the connection points 220 in the electrical box 214 include integral bosses 244 extending from opposing sides 216 of the electrical box 214 and bores 246 in the bosses 244. As shown in FIG. 17, the electrical box 214 is a two-gang box that includes space for two electrical components (not shown) and includes two sets of integral bosses 244. The box member 202 includes a plurality of openings 248 in the back wall 212 for later accommodating low voltage electrical components (not shown). The openings 248 include connection points 250 in the back wall 212 for securing low voltage components thereto. The connection points 250 for the low voltage components include bosses 252 on opposing sides of the openings 248 in the back wall 212 of the box member 202.

Figure 19:
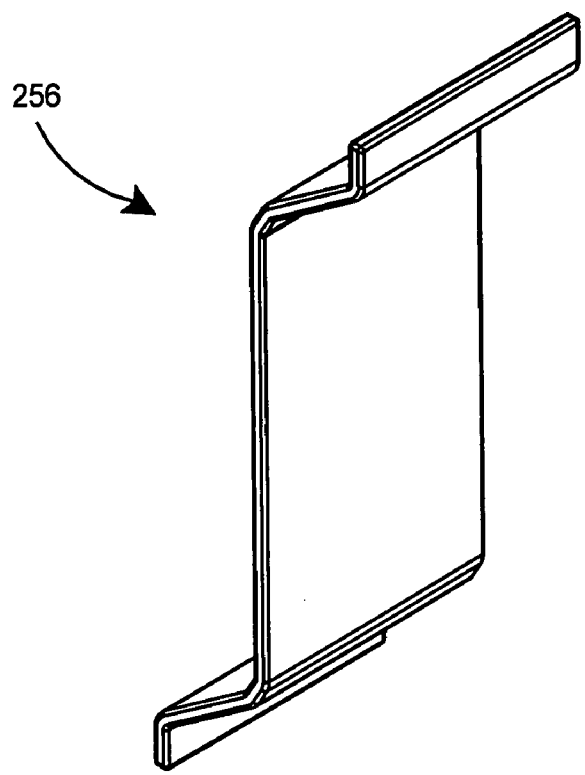
FIG. 19 is a perspective view of a divider wall that forms a portion of the preferred embodiment of the electrical box assembly of the present invention.

As shown in FIG. 17, the preferred embodiment of the electrical box assembly includes a two-gang electrical box 214. Opposing sides 216 of the electrical box 214 include grooves 254 therein for dividing the two-gang box into single electrical boxes. A divider wall 256, such as that shown in FIG. 19, can be inserted or slid into the grooves 254 to dividing the electrical box into two single electrical boxes.

Figure 18:
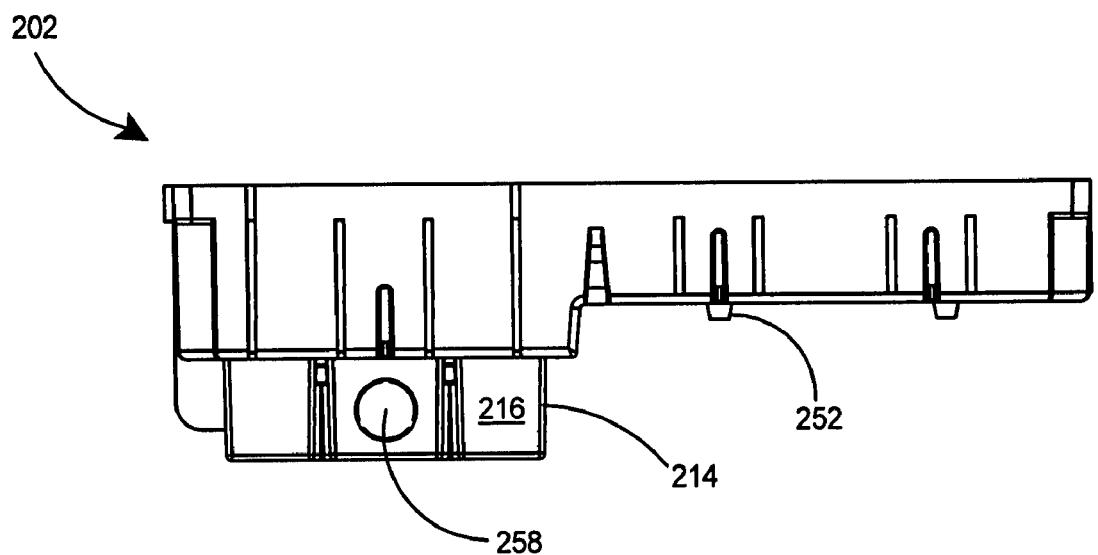
FIG. 18 is a bottom view of the box member of FIG. 15.

As shown in FIG. 18, one or more sides 216 of the electrical box 214 are provided with removable wall portions or knockouts 258. The knockouts 258 are removed to provide openings for passage of electrical cable (not shown) into the electrical box 214. Additionally, the knockouts 258 can have electrical fittings or connectors inserted therein for connecting electrical cables to the electrical box.

Figure 20:
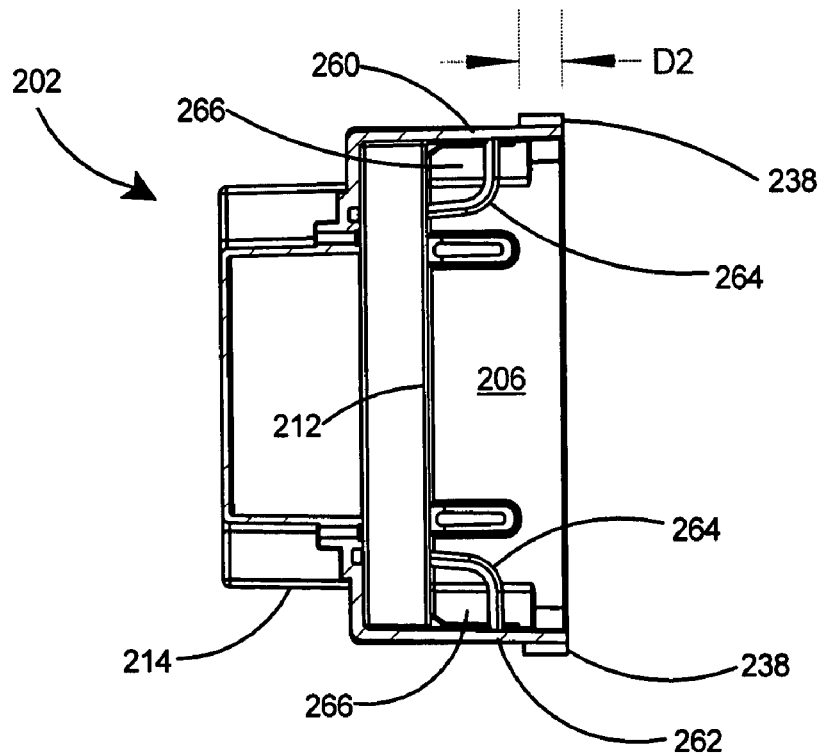
FIG. 20 is a sectional view of the box member taken along line 20-20 of FIG. 17.
Figure 21:
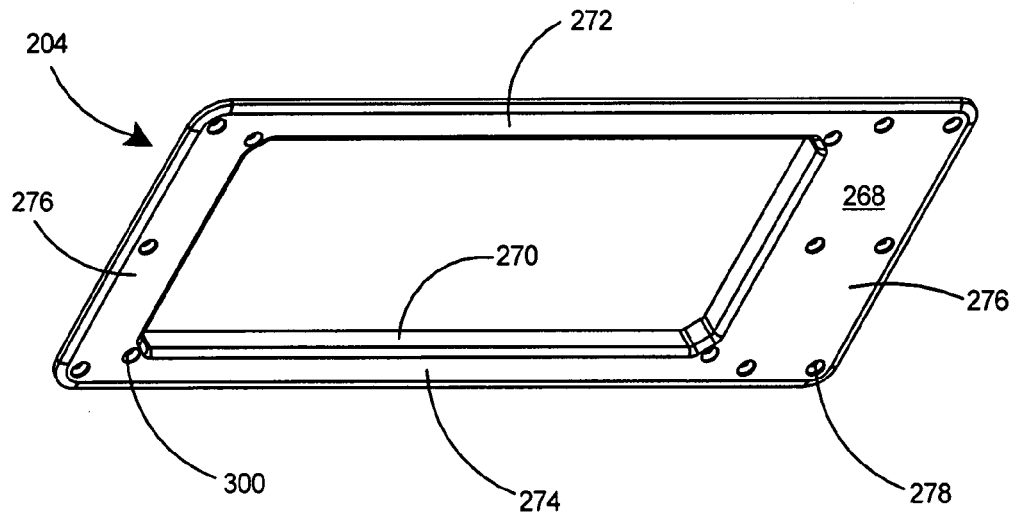
FIG. 21 is a perspective view of the preferred embodiment of a frame member that forms a portion of the flat panel TV box assembly of FIG. 14.

With reference to FIG. 20, the peripheral sidewall 206 of the box member 202 further includes a top wall portion 260 and a bottom wall portion 262. A loop member 264 is provided on the bottom wall portion 262 and on the top wall portion 260. The loop members 264 extend from the back wall 212 to the top or bottom wall portions 260, 262 and include an opening 266 therein. The loop member 264 can be used for bundling and holding cables and wiring (not shown) against the back wall 212 of the box member 202.

Figure 22:
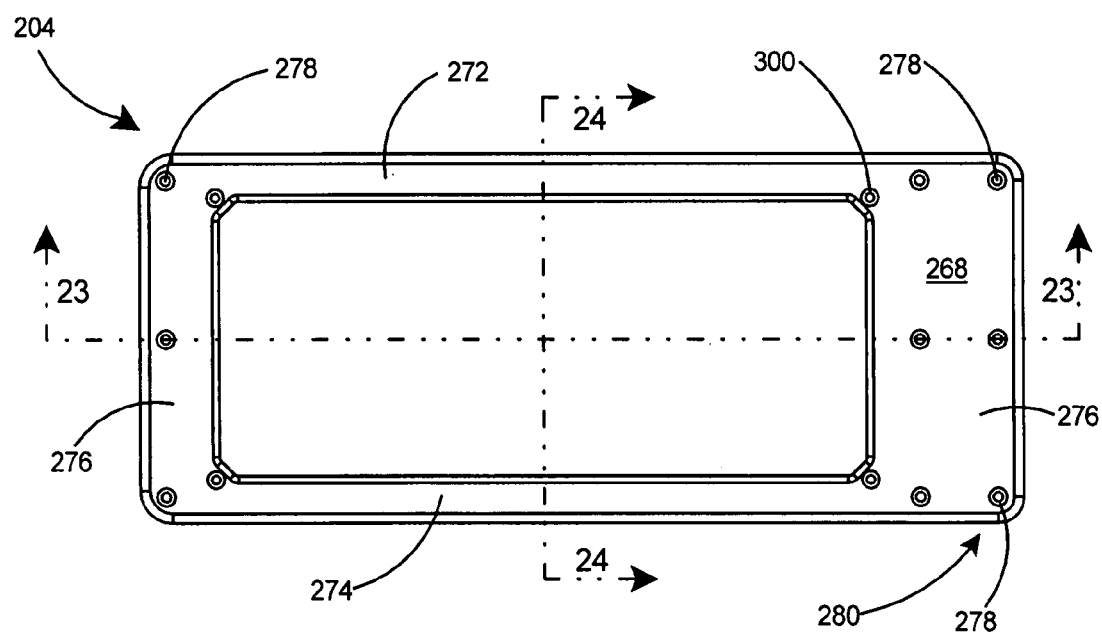
FIG. 22 is a front view of the frame member of FIG. 21.

Referring to FIGS. 21-24, the frame member 204 portion of the electrical box assembly is shown. The frame member 204 includes a transverse flange 268 and a rearward extending peripheral flange 270. The transverse flange 268 includes a top portion 272, a bottom portion 274, and side portions 276. As shown in FIG. 22, mounting apertures 278 are provided in the side portions 276 of the transverse flange 268 and form a portion of a mounting arrangement 280 for mounting the electrical box assembly to a wall.

Figure 25:
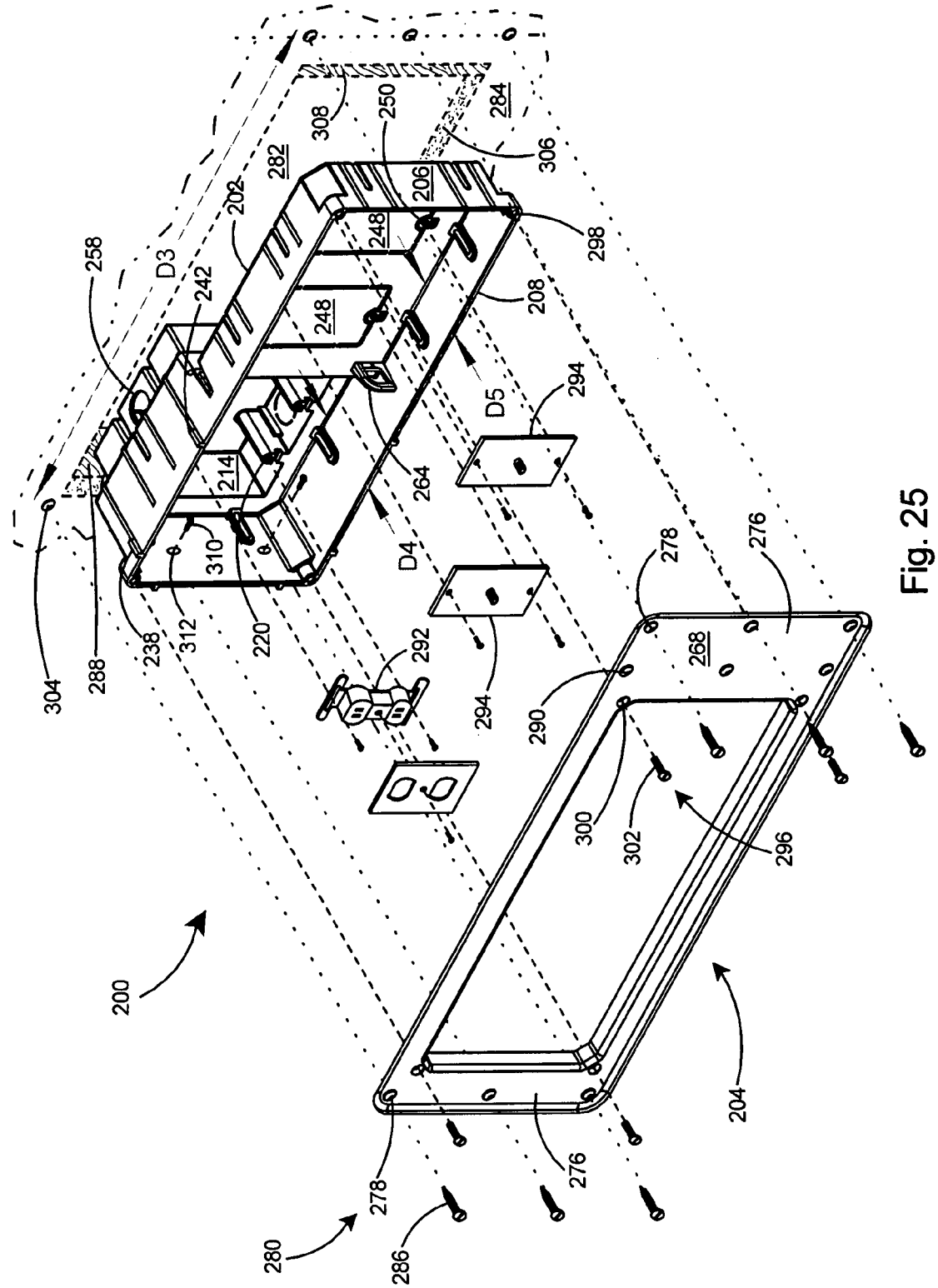
FIG. 25 is an exploded perspective view of a preferred embodiment of the flat panel TV box assembly of the present invention including a box member and a frame member and some high and low voltage components in alignment with the box assembly to be installed therein.

With reference to FIG. 25, there is shown the preferred embodiment of the electrical box assembly 200 in alignment with a hole 282 in a wall 284 to be inserted therein and mounted to the wall 284. The mounting arrangement 280 includes the mounting apertures 278 in the transverse flange 268 and mounting fasteners 286 for tightening through the mounting apertures 278 into a stud 288. The mounting apertures 278 in side portions 276 of the transverse flange 268 are preferably spaced apart by a distance equivalent to the spacing D3 between the studs 288. If, for example, the distance D3 between the studs 288 was 16 inches, then mounting apertures 278 are preferably spaced apart by a distance of between 15.5 and 16.5 inches, or most preferably by 16 inches. The hole 282 made in the wall 284 would therefore be made to extend between two adjacent studs. For wood studs 288, wood screws would preferably be used to secure the electrical box assembly 200 to the wall 284. For metal studs (not shown), sheet metal screws or their equivalents would be used to secure the electrical box assembly 200 to the wall 284. A second set of apertures 290 are provided on one side of the transverse flange 268 inward of the mounting apertures 278 for walls with studs spaced apart at a distance of 14.5 inches. For longer stud spacing, one end of the transverse flange 268 would be anchored into a stud in the normal manner and the opposite end would be anchored to the drywall with drywall screws. Also, the electrical box assembly 200 could be constructed in a larger length to accommodate a longer stud spacing.

As shown in FIG. 25, the electrical box 214 extends at a first depth D4 from the front edge 208 of the box member 202. The low voltage openings 248 extend at a second depth D5 from the front edge 208 of the box member 202. As a result of the electrical box 214 being offset at a greater distance from the front edge 208, any high voltage component, such as the duplex receptacle 292 will be recessed a greater depth D4 within the wall 284 than would a low voltage component 294 such as the CATV outlet plate shown in FIG. 25.

In the preferred embodiment of the electrical box assembly 200 of the present invention, the box member 202 could be provided in one piece, as shown in FIG. 14, with the transverse flange 268 as an integral part of the box member 202. Conversely, as shown in FIG. 25, the electrical box assembly 200 could be provided with a separate box member 202 and frame member 204. An attachment arrangement 296 for securing the frame member 204 to the box member 202 includes a plurality of bosses 298 on the peripheral sidewall 206 of the box member 202 and a plurality of apertures 300 in the frame member 204. The apertures 300 in the frame member 204 are in axial alignment with the bosses 298 on the box member 202 when the frame member 204 is aligned with the box member 202. Fasteners 302 are used in the attachment arrangement 296 for securing through the apertures 300 in the frame member 204 into the bosses 298 on the box member 202.

The reader is referred to FIG. 25 for an understanding of the operation of the preferred embodiment of the electrical box assembly 200 including a separate box member 202 and frame member 204. An appropriately sized hole 282 to accommodate the outer periphery of the box member 202 and spanning the distance between two studs 288 is cut in the wall 284. FIG. 25 illustrates a wall having studs spaced a distance D3 apart on their centers. The frame member 204 is then secured to the box member 202 using fasteners 302 through apertures 300 of frame member 204 into bosses 298 in box member 202. Cables are then fed through the appropriate openings including knockouts 258 for high voltage cables or through openings 248 for low voltage cables. The cables (not shown) can be routed through loop members 264 to hold them within the box member 202. The electrical box assembly 200, consisting of the frame member 204 secured to the box member 202, is then secured to the wall using the mounting arrangement 280 including mounting fasteners 286 secured through mounting apertures 278 in the transverse flange 268 and into apertures 304 and the studs 288 in the wall 284. High voltage components, such as the duplex receptacle 292 shown, are then secured to the high voltage connection points 220 within the electrical box assembly 200 and low voltage components, such as the CATV outlets 294, are secured to the low voltage connection points 250 within the electrical box assembly 200.

With continued reference to FIG. 25, in the case of installing the electrical box assembly 200 on a newly constructed wall in which the sheetrock 306 has not yet been installed, tabs 238 are used to align the box member 202 against the bare studs. In this situation, the second or rear ends 242 of the tabs 238 are placed against the face 308 of the studs 288, which would position the box member 202 at the correct distance to place the front edge 208 of the box member 202 approximately flush with the eventual face of the installed sheetrock 306. Fasteners 310 are secured through apertures 312 in the peripheral sidewall 206 of the box member 202 to temporarily secure the box member 202 to the wall until the sheetrock 306 is installed and the frame member 204 is secured to the box member 202 and to the wall 284 by mounting arrangement 280.

Figure 26:
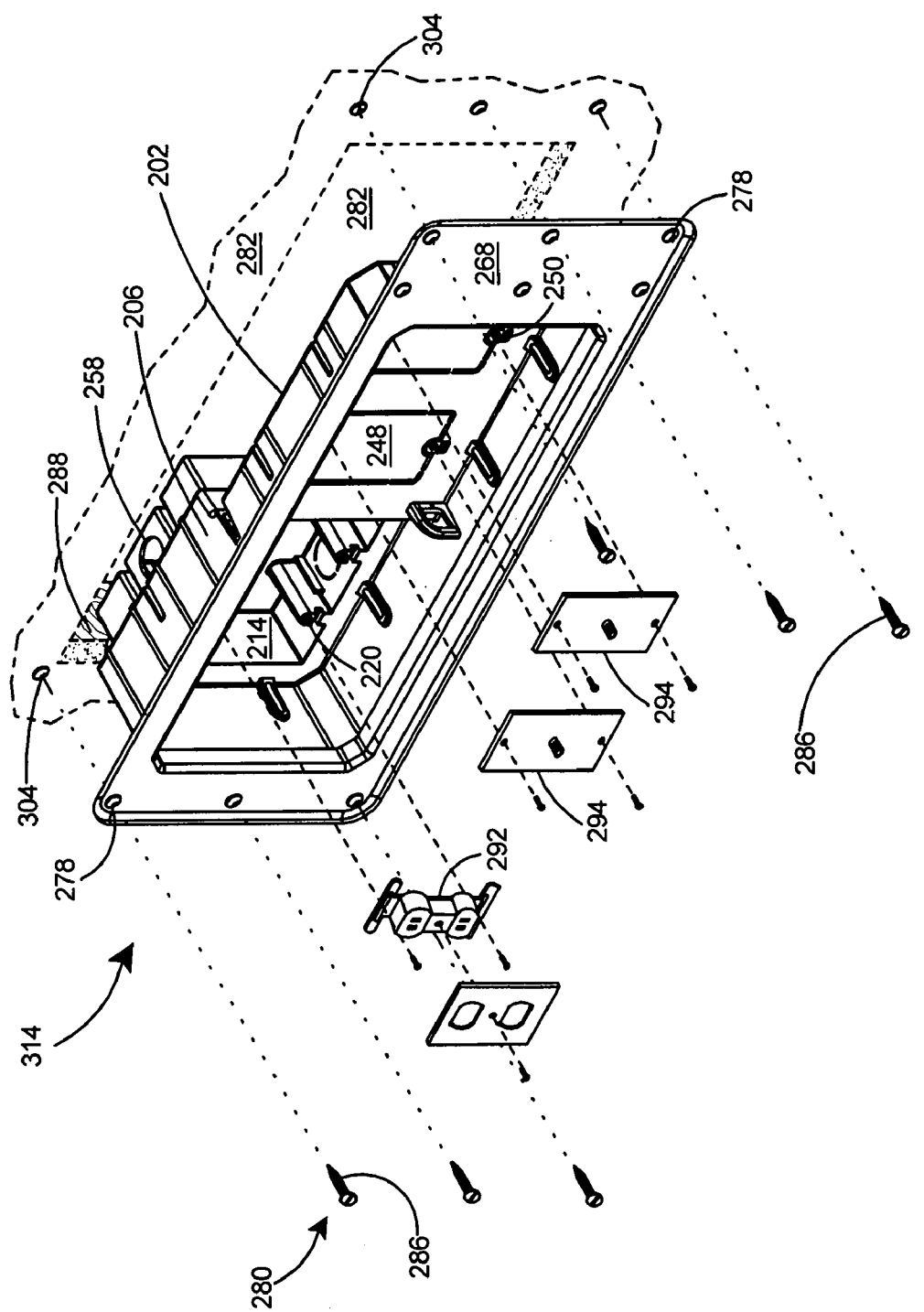
FIG. 26 is an exploded perspective view of another preferred embodiment of the flat panel TV box assembly of the present invention including a one-piece box member and some high and low voltage components in alignment with the box assembly to be installed therein.

The reader is referred to FIG. 26 for an understanding of the operation of the one-piece preferred embodiment of the electrical box assembly 314 in which the transverse flange 268 is an integral portion of the box member 202. An appropriately sized hole 282 to accommodate the outer periphery of the peripheral sidewall 206 of the box member 202 and spanning the distance between two studs 288 is cut in the wall 284. Cables (not shown) are then fed through the appropriate openings including knockouts 258 for high voltage cables or through openings 248 for low voltage cables. The electrical box assembly 314, consisting of the one-piece box member 202, is then secured to the wall using the mounting arrangement 280 including mounting fasteners 286 secured through mounting apertures 278 in the transverse flange 268 and into apertures 304 and the studs 288 in the wall 284. High voltage components, such as the duplex receptacle 292 shown, are then secured to the high voltage connection points 220 within the electrical box assembly 314 and low voltage components, such as the CATV outlets 294, are secured to the low voltage connection points 250 within the electrical box assembly 314.

Figure 27:
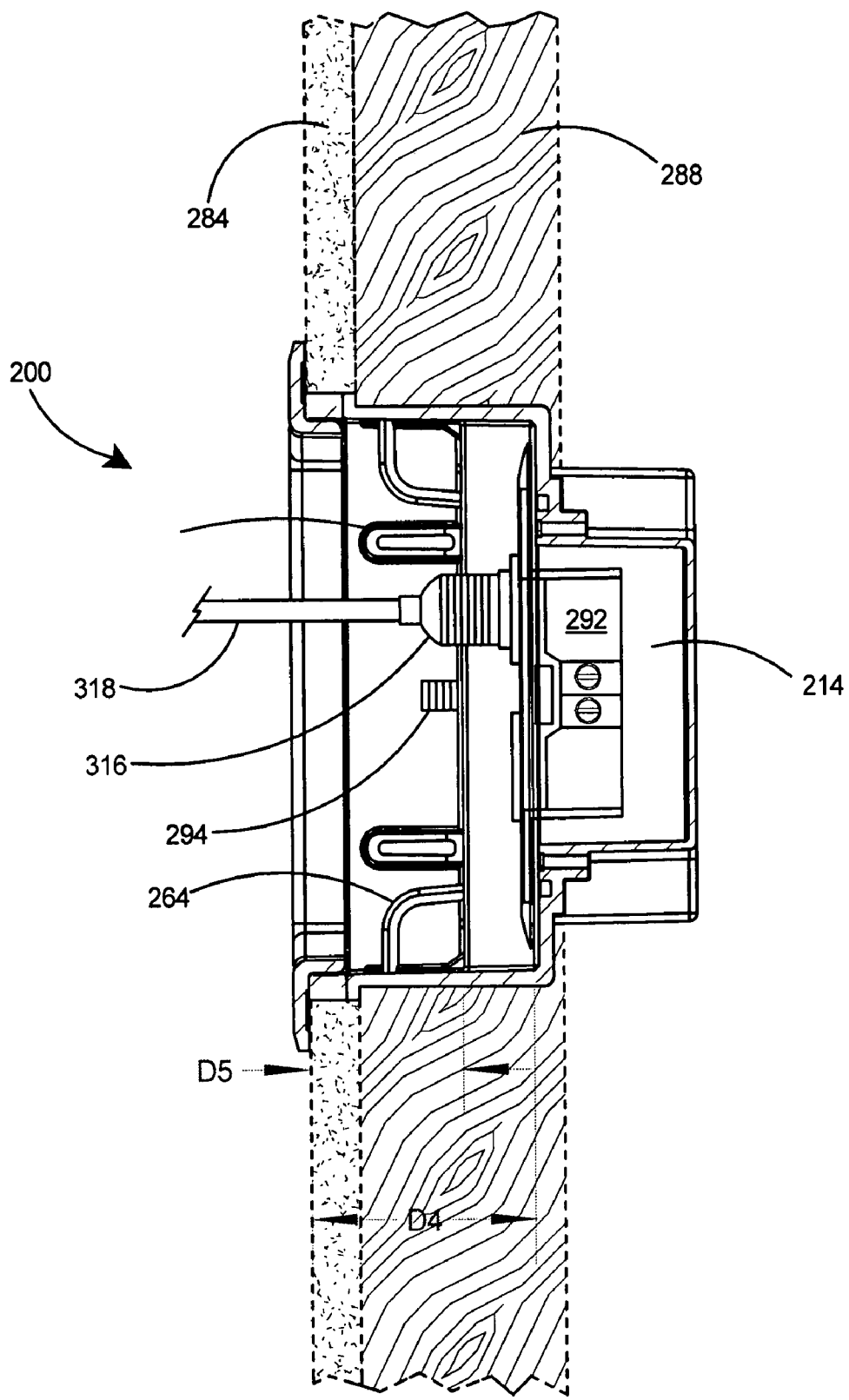
FIG. 27 is a sectional view of the preferred embodiment of the flat panel TV box assembly mounted in a wall and with a duplex power receptacle secured therein and an electrical cord plugged in the duplex receptacle.

As shown in FIG. 27, after the electrical box assembly 200 has been secured to the wall 284, both high voltage components 292 and low voltage components 294 are recessed substantially within the wall 284, thus protecting the components. High voltage components such as the duplex receptacle 292 shown are offset a distance D4 and low voltage components 294 are offset a distance D5. The greater offset of the duplex receptacle 292 provides ample space for protecting plug ends 316 of electrical cords 318 while they are in use and plugged into the duplex receptacle 292.

As shown and described herein, the current invention provides an improved electrical box assembly 200 or 314 that has the advantage of accommodating two high voltage components and recesses the high voltage components farther within the wall. It also provides the advantage of an extended flange for more secure mounting of the electrical box assembly to a wall.

The electrical box assembly of the present invention could be constructed of metal or plastic but, most preferably, is molded of plastic. In a first method of construction, the box member 202 of the present invention is molded in one piece of plastic and the frame member 204 is also molded in one piece of plastic. In a second method of construction, a single piece is molded in one piece of plastic with the single piece being a box member including a transverse flange as an integral molded portion of the box member thereby negating the need for a separated frame member. Suitable plastics include polycarbonate and polyvinylchloride.

Having thus described the invention with reference to a preferred embodiment, it is to be understood that the invention is not so limited by the description herein but is defined as follows by the appended claims.

What is claimed is:

1. An electrical box assembly comprising:
   a box member including a rearward extending peripheral sidewall having a front edge;
   a flange extending outward transversely from said front edge;
   a back wall closing a first portion of said box member; and
   an electrical box extending rearward from a second portion of said box member, said electrical box including sides and a rear wall;
   connection points in said electrical box for connecting an electrical component thereto;
   a mounting arrangement for securing said electrical box assembly to a wall;
   a top wall portion and a bottom wall portion on said peripheral sidewall of said box member;
   a loop member extending from said bottom wall portion and from said top wall portion; and
   said loop member including an opening therein.

2. The electrical box assembly of claim 1 wherein said mounting arrangement includes
   apertures in said flange; and
   fasteners for tightening through said apertures into a stud.

3. The electrical box assembly of claim 2 wherein
   said flange includes a top portion, a bottom portion, and side portions; and
   said apertures of said mounting arrangement are in said side portions of said flange.

4. The electrical box assembly of claim 2 wherein said apertures in said flange are spaced apart by a distance substantially equal to the spacing between said stud and an adjacent stud in a building.

5. The electrical box assembly of claim 4 wherein said apertures in said flange are spaced apart by a distance of between 15.5 and 16.5 inches.

6. The electrical box assembly of claim 1 wherein
   said first portion of said box member includes a first sidewall portion;
   said second portion of said box member includes a second sidewall portion; and
   said second sidewall portion extends to a greater depth than said first sidewall portion.

7. The electrical box assembly of claim 6 including
   a rear edge on said second sidewall portion;
   a short wall extending transversely at said rear edge of said second sidewall portion and terminating in an edge; and
   said sides of said electrical box extend from said edge of said short wall.

8. The electrical box assembly of claim 1 wherein
   said connection points in said electrical box include integral bosses extending from opposing sides of said electrical box; and
   bores in said bosses.

9. The electrical box assembly of claim 8 wherein said electrical box includes space for two electrical components and two sets of said integral bosses.

10. The electrical box assembly of claim 1 wherein said box member includes a plurality of stiffening ribs extending from said back wall and along a substantial portion of said peripheral sidewall toward said front edge.

11. The electrical box assembly of claim 1 including
    a plurality of low voltage openings in said back wall of said box member;
    connection points in said back wall for securing low voltage components thereto; and
    said connection points for the low voltage components include bosses on opposing sides of said openings in said back wall of said box member.

12. The electrical box assembly of claim 11 wherein
    said electrical box extends at a first depth from said front edge of said box member;
    said low voltage openings extend at a second depth from said front edge of said box member; and
    said first depth is greater than said second depth whereby a high voltage component is recessed within a wall to a greater depth than a low voltage component.

13. The electrical box assembly of claim 1 wherein
    said sides of said electrical box include grooves therein in opposing sides of said box; and
    said electrical box assembly including a divider wall for insertion in said grooves for dividing said electrical box into two separate electrical boxes.

14. An electrical box assembly comprising:
    a box member including peripheral wall having a rear edge;
    a frame member including a rearward extending peripheral flange and a transverse flange;
    a first portion of said box member closed by a back wall extending across said rear edge;
    a second portion of said electrical box including an electrical box extending from said rear edge of said box member;
    connection points on said back wall of said box member for securing low voltage components thereto;
    an attachment arrangement for securing said frame member to said box member;
    a mounting arrangement for securing said electrical box assembly to a wall and thereby positioning said back wall of said box member substantially within the wall;
    a top wall portion and a bottom wall portion on said peripheral sidewall of said box member;
    a loop member extending from said bottom wall portion and from said top wall portion; and
    said loop member including an opening therein.

15. The electrical box assembly of claim 14 wherein said attachment arrangement for securing said frame member to said box member includes a plurality of bosses on said peripheral sidewall of said box member; and a plurality of apertures in said frame member in axial alignment with said bosses on said box member; and a plurality of fasteners for securing through said apertures in said frame member into said bosses on said box member.

16. The electrical box assembly of claim 14 wherein said mounting arrangement includes apertures in said flange; and fasteners for tightening through said apertures into a stud.

17. The electrical box assembly of claim 14 wherein said peripheral wall of said box member includes a depth; and a high voltage component secured within said electrical box and a low voltage component secured to said connection points positions the high and low voltage components within a wall by at least said depth of said peripheral wall of said box member.

18. The electrical box assembly of claim 1 wherein said peripheral sidewall of said box member include an outer surface;

tabs extending from said outer surface of said peripheral sidewall, said tabs include a first end flush with said front edge of said box member and a second end at a distance from said front edge; and said distance is between 0.25 and 0.75 inches to align said front edge of said box member at a proper offset from a stud for accommodating sheetrock thereon.

19. An electrical box assembly comprising:

a one-piece box member including a rearward extending peripheral sidewall having a front edge;

a flange integral with said one-piece box member, said flange extending outward transversely from said front edge;

a back wall closing a first portion of said box member; and an electrical box extending rearward from a second portion of said box member, said electrical box including sides and a rear wall;

connection points in said electrical box for connecting an electrical component thereto;

a mounting arrangement for securing said electrical box assembly to a wall;

a top wall portion and a bottom wall portion on said peripheral sidewall of said box member;

a loop member extending from said bottom wall portion and from said top wall portion; and said loop member including an opening therein.

* * * * *